(12) United States Patent
Chan et al.

(10) Patent No.: US 7,773,028 B2
(45) Date of Patent: Aug. 10, 2010

(54) METHOD AND SYSTEM FOR CONCATENATION OF RADAR PULSES

(75) Inventors: Tony Meng Yuen Chan, Waterloo (CA); Mark Gerecke, Waterloo (CA)

(73) Assignee: Raytheon Company, Waltham, MA (US)

( * ) Notice: Subject to any disclaimer, the term of this patent is extended or adjusted under 35 U.S.C. 154(b) by 435 days.

(21) Appl. No.: 11/832,973

(22) Filed: Aug. 2, 2007

(65) Prior Publication Data

US 2008/0136704 A1 Jun. 12, 2008

Related U.S. Application Data

(60) Provisional application No. 60/872,991, filed on Dec. 6, 2006.

(51) Int. Cl.
*G01S 13/12* (2006.01)
*G01S 13/10* (2006.01)
*G01S 13/24* (2006.01)
*G01S 7/28* (2006.01)
*G01S 13/00* (2006.01)
*G01S 7/02* (2006.01)

(52) U.S. Cl. .......... 342/137; 342/82; 342/89; 342/118; 342/134; 342/175; 342/195; 342/202

(58) Field of Classification Search .......... 342/82–103, 342/118, 128, 130–132, 134–145, 175, 189–197, 342/200–204, 21, 22, 159–164
See application file for complete search history.

(56) References Cited

U.S. PATENT DOCUMENTS 4,136,341 A 1/1979 Mulder et al.

(Continued)

FOREIGN PATENT DOCUMENTS

EP 0 016 597 A1 10/1980

(Continued)

OTHER PUBLICATIONS

B. Assanovich et al., "Modification of Pulse Position Modulation for High Data UWB Systems and Multi-User Communication"; Proceedings of the 15TH International Conference on Microwaves, Radar and Wireless Communications, 2004; vol. 3, pp. 1024-1027; Published Nov. 22, 2004; ISBN: 83-906662-7-8; Inspec Accession No. 8190545.*

(Continued)

*Primary Examiner*—Bernarr E Gregory
(74) *Attorney, Agent, or Firm*—Daly, Crowley, Mofford & Durkee, LLP

(57) ABSTRACT

A system and method are described for generating waveforms for use in radar and sonar systems. The system includes waveform generation circuitry a waveform generator and an up-conversion module. The waveform generator generates concatenated pulse waveforms at an IF band. In a given pulse repetition interval (PRI), the concatenated pulse waveforms comprise a first and second pulse types associated with first and second IF frequencies respectively. The up-conversion module up-converts the concatenated pulse waveforms to an RF band to form first and second sets of pulses. In the given PRI, each pulse is up-converted to a different RF frequency, pulses of different lengths are associated with a similar carrier frequency, and at least one pulse from each of the sets of pulses implements frequency diversity.

31 Claims, 7 Drawing Sheets

U.S. PATENT DOCUMENTS

| | | | |
|---|---|---|---|
| 4,309,703 A | 1/1982 | Blahut | |
| 4,524,361 A | 6/1985 | Teulings | |
| 4,626,855 A | 12/1986 | Rouse | |
| 4,890,113 A * | 12/1989 | Jacomini | 342/163 |
| 4,983,979 A | 1/1991 | McKenzie | |
| 4,996,534 A | 2/1991 | Grubbs et al. | |
| 5,036,324 A | 7/1991 | Lamper et al. | |
| 5,057,845 A | 10/1991 | Gellekink | |
| 6,111,537 A | 8/2000 | Andersson | |
| 6,639,546 B1 | 10/2003 | Ott et al. | |
| 7,081,848 B1 | 7/2006 | Adams | |
| 2005/0179585 A1 | 8/2005 | Walker et al. | |
| 2005/0242985 A1 | 11/2005 | Ponsford et al. | |
| 2007/0008214 A1 | 1/2007 | Wasiewicz | |

FOREIGN PATENT DOCUMENTS

| | | |
|---|---|---|
| EP | 0 184 424 A2 | 6/1986 |
| EP | 0 184 424 A3 | 6/1986 |
| EP | 0 184 424 B1 | 6/1986 |
| EP | 0 427 469 A2 | 5/1991 |

OTHER PUBLICATIONS

PCT Search Report and Written Opinion of the ISA for PCT/CA2007//002097 dated Mar. 7, 2008.

* cited by examiner

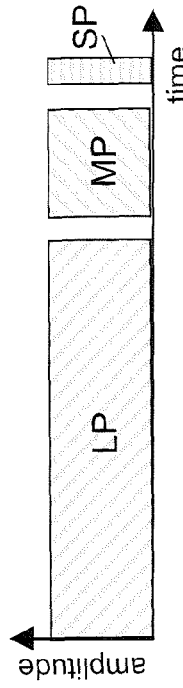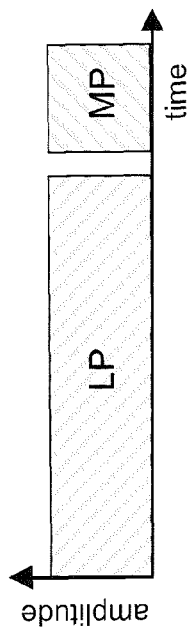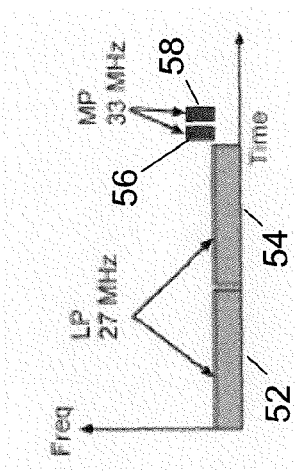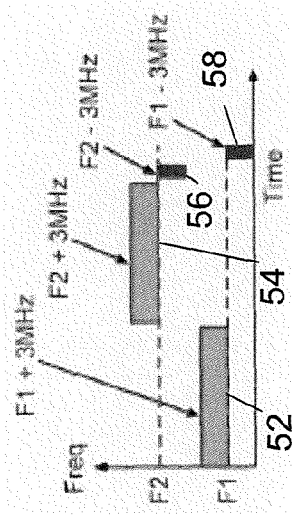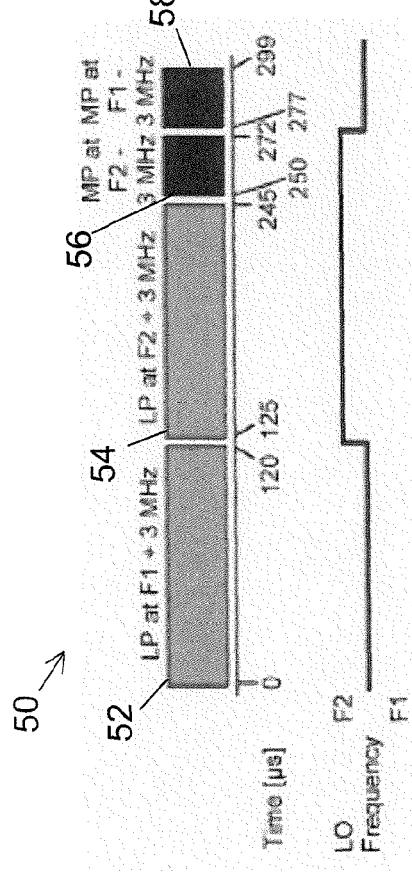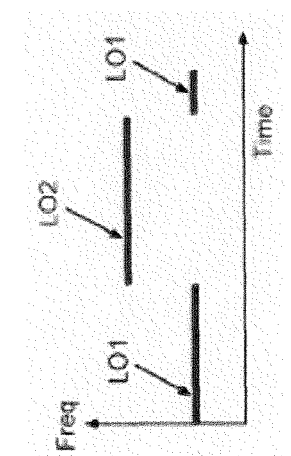

METHOD AND SYSTEM FOR CONCATENATION OF RADAR PULSES

CROSS REFERENCE TO RELATED APPLICATIONS

This application claims the benefit under 35 U.S.C. §119(e) of Provisional application No. 60/872,991 filed Dec. 6, 2006 which application is incorporated herein by reference in its entirety.

FIELD

Embodiments are described herein for a radar system and method for concatenating radar pulses to provide radar coverage over a large range including short and far ranges.

BACKGROUND

The design of any radar poses several challenges. One challenge is that in order to have sufficient sensitivity over longer ranges, pulses emitted by the radar must contain a large amount of energy. A high-energy pulse may be achieved by sending out a short pulse with a high peak-power. However, the cost, maintenance burden, low reliability and safety restrictions of radar equipment capable of producing a high-power pulse is often prohibitive. An alternative method of producing a pulse with a large amount of energy is to send out a longer pulse with a lower peak-power. The loss of range resolution that is associated with using a longer pulse may be recovered by using a pulse compression technique upon reception of the signal. However, using a longer pulse length is also problematic since a longer pulse will lose sensitivity in the near range because any reflected signals that arrive at the radar while the pulse is still being emitted may not be received and processed. In addition, at a given radar site, there may be a blocking profile in effect which limits the range of frequencies that can be used in the pulses while trying to achieve detection of short and long range targets.

SUMMARY OF THE INVENTION

In accordance with the present invention, a transceiver for a radar system, includes waveform generation circuitry configured to generate concatenated pulse waveforms, wherein, in a given pulse repetition interval (PRI), the concatenated pulse waveforms include first and second sets of pulses with the first set of pulses having a first carrier frequency and a first pulse length and the second set of pulses having a second different carrier frequency and a second different pulse length. The transceiver further includes transmission circuitry coupled to the waveform generation circuitry and configured to generate transmission waveforms based upon the concatenated pulse waveforms.

With this particular arrangement, a transceiver which can provide radar transmission waveforms which can simultaneously achieve desirable range coverage between a minimum and a maximum range, while satisfying radar range resolution performance requirements is provided. The transceiver can further include a receive antenna and receiving circuitry coupled to the waveform generation circuitry and the receive antenna. The receiving circuitry is adapted to process radar return signals to separate the reflections for each type of pulse in the concatenated pulse waveforms.

In accordance with a further aspect of the present invention, a radar system includes a control unit configured to control the operation of the radar system, a transceiver coupled to the control unit and connectable to an antenna, a transceiver configured to generate and send concatenated pulse waveforms to the antenna and process reflections of the concatenated pulse waveforms sensed by the antenna to generate return signals, the transceiver comprising waveform generation circuitry configured to generate the concatenated pulse waveforms, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second set of pulses having pulses of different lengths and frequencies, and a radar processing unit coupled to the transceiver and the control unit, the radar processing unit being configured to process the return signals and provide information on possible detected targets.

With this particular arrangement, a radar system which can simultaneously achieve a desirable range coverage between a minimum and maximum range, while satisfying range resolution performance requirements using a low-cost, low peak-power transmitter is provided. The type of pulses used in the concatenated waveforms result in low peak power since the power of the pulses are spread over the length of the pulses. The low peak power then allows for the use of transistors in various hardware components of the radar system which results in low cost. Furthermore, all of the reception hardware can be implemented in one unit which helps to reduce cost. Redundancy can then be inexpensively achieved by adding similar reception components in a second unit. The radar system can also utilize frequency diversity in one Pulse Repetition Interval (PRI) to get a 3 dB improvement in the Signal-to-Noise (SNR) ratio of the processed radar data.

In accordance with a yet further aspect of the present invention, waveform generation circuitry configured to generate waveforms for use in radar includes a waveform generator configured to generate concatenated pulse waveforms at an IF band, wherein, in a given pulse repetition interval (PRI), the concatenated pulse waveforms comprise a first type of pulse associated with a first IF frequency and a second type of pulse associated with a second IF frequency; and an up-conversion module configured to up-convert the concatenated pulse waveforms to an RF band to form first and second set of pulses, wherein, in the given PRI, each pulse is up-converted to a different RF frequency, pulses of different lengths are associated with a similar carrier frequency, and at least one pulse from each of the sets of pulses implements frequency diversity.

With this particular arrangement, a circuit for generating various waveforms is provided. The characteristics for these waveforms can be selected independently from one another. The concatenated pulse waveforms generally comprise pulses with a certain order within a given Pulse Repetition Interval (PRI) for pulses that are used to detect targets at various ranges from the radar site. Pulses of different lengths are ordered in such a way to provide a "fill" for a blanking interval. For instance, when a long pulse (LP) having a length of 120 µs is transmitted, this time corresponds to a range of about 10 nmi which is being blocked during the transmission of the LP. Accordingly, to detect targets that are within 10 nmi of the radar, a shorter pulse can be transmitted after the LP has been transmitted in the same PRI. For instance, a medium pulse (MP) can be transmitted after the LP has been transmitted. The MP will also block some of the return signals but the return signals will be blocked over a shorter range since the MP is shorter than the LP. To fill in a portion of the returns that are blocked by the MP, a short pulse (SP) can be transmitted after the MP. These three pulses can be transmitted in the same PRI. Therefore, if the minimum range is to be extended below a certain value, the concatenated pulse can have a SP at the end that is short enough to achieve this minimum range value. Since the SP already has a short time duration, pulse compression does not need to be used, whereas it can be used for the other pulses. Further variations on the concatenated pulse waveforms are also possible. Since the pulses are separated in frequency, values for parameters for these pulses can be selected somewhat independently from one another. For instance, any modulation can be applied to one of the pulses irrespective of the modulation applied to the other pulses. Frequency diversity is also possible as is described in more detail below.

In accordance with a still further aspect of the present invention, a method of generating waveforms for use in radar includes generating concatenated pulse waveforms at an IF band, wherein, in a given pulse repetition interval, the concatenated pulse waveforms comprise a first group of pulses associated with a first IF frequency and a second group of pulses associated at a second IF frequency, and up-converting the concatenated pulse waveforms to an RF band to form first and second set of pulses, wherein, in the given pulse interval, each pulse is up-converted to a different RF frequency, pulses of different lengths are associated with a similar carrier frequency, at least one pulse from each of the sets of pulses implements frequency diversity, and longer pulses are temporally ordered before shorter pulses.

With this particular arrangement, various waveforms can be generated and the characteristics for these waveforms can be selected independently from one another. The concatenated pulse waveforms generally comprise pulses with a certain order within a given Pulse Repetition Interval (PRI) for pulses that are used to detect targets at various ranges from the radar site. Pulses of different lengths are ordered in such a way to provide a "fill" for a blanking interval. For instance, when a long pulse (LP) having a length of 120 µs is transmitted, this time corresponds to a range of about 10 nmi which is being blocked during the transmission of the LP. Accordingly, to detect targets that are within 10 nmi of the radar, a shorter pulse can be transmitted after the LP has been transmitted in the same PRI. For instance, a medium pulse (MP) can be transmitted after the LP has been transmitted. The MP will also block some of the return signals but the return signals will be blocked over a shorter range since the MP is shorter than the LP. To fill in a portion of the returns that are blocked by the MP, a short pulse (SP) can be transmitted after the MP. These three pulses can be transmitted in the same PRI. Therefore, if the minimum range is to be extended below a certain value, the concatenated pulse can have a SP at the end that is short enough to achieve this minimum range value. Since the SP already has a short time duration, pulse compression does not need to be used, whereas it can be used for the other pulses. Further variations on the concatenated pulse waveforms are also possible. Since the pulses are separated in frequency, values for parameters for these pulses can be selected somewhat independently from one another. For instance, any modulation can be applied to one of the pulses irrespective of the modulation applied to the other pulses. Frequency diversity is also possible.

In accordance with a still further aspect of the present invention, a method for generating and receiving waveforms for use in radar applications includes generating concatenated pulse waveforms, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second set of pulses having pulses of different lengths and frequencies, generating transmission waveforms based on the concatenated pulse waveforms, sending the transmission waveforms to an antenna, receiving reflections of the transmission waveforms sensed by the antenna, producing return signals based on the received reflections and processing the return signals to separate the reflections for each type of pulse in the concatenated pulse waveforms.

With this particular arrangement, various waveforms can be generated and the characteristics for these waveforms can be selected independently from one another. The concatenated pulse waveforms generally comprise pulses with a certain order within a given Pulse Repetition Interval (PRI) for pulses that are used to detect targets at various ranges from the radar site. Pulses of different lengths are ordered in such a way to provide a "fill" for a blanking interval. For instance, when a long pulse (LP) having a length of 120 µs is transmitted, this time corresponds to a range of about 10 nmi which is being blocked during the transmission of the LP. Accordingly, to detect targets that are within 10 nmi of the radar, a shorter pulse can be transmitted after the LP has been transmitted in the same PRI. For instance, a medium pulse (MP) can be transmitted after the LP has been transmitted. The MP will also block some of the return signals but the return signals will be blocked over a shorter range since the MP is shorter than the LP. To fill in a portion of the returns that are blocked by the MP, a short pulse (SP) can be transmitted after the MP. These three pulses can be transmitted in the same PRI. Therefore, if the minimum range is to be extended below a certain value, the concatenated pulse can have a SP at the end that is short enough to achieve this minimum range value. Since the SP already has a short time duration, pulse compression does not need to be used, whereas it can be used for the other pulses. Further variations on the concatenated pulse waveforms are also possible. Since the pulses are separated in frequency, values for parameters for these pulses can be selected somewhat independently from one another. For instance, any modulation can be applied to one of the pulses irrespective of the modulation applied to the other pulses. Frequency diversity is also possible.

BRIEF DESCRIPTION OF THE DRAWINGS

For a better understanding of the embodiments described herein, and to show more clearly how they may be carried into effect, reference will now be made, by way of example only, to the accompanying drawings in which:

FIGS. 2A-2B are illustrations of exemplary embodiments of concatenated waveforms that can be produced by the radar system of FIG. 1;

FIGS. 3A-3D are illustrations of an exemplary embodiment of another concatenated pulse waveform that can be produced by the radar system of FIG. 1;

DETAILED DESCRIPTION OF THE EMBODIMENTS

Figure 1:
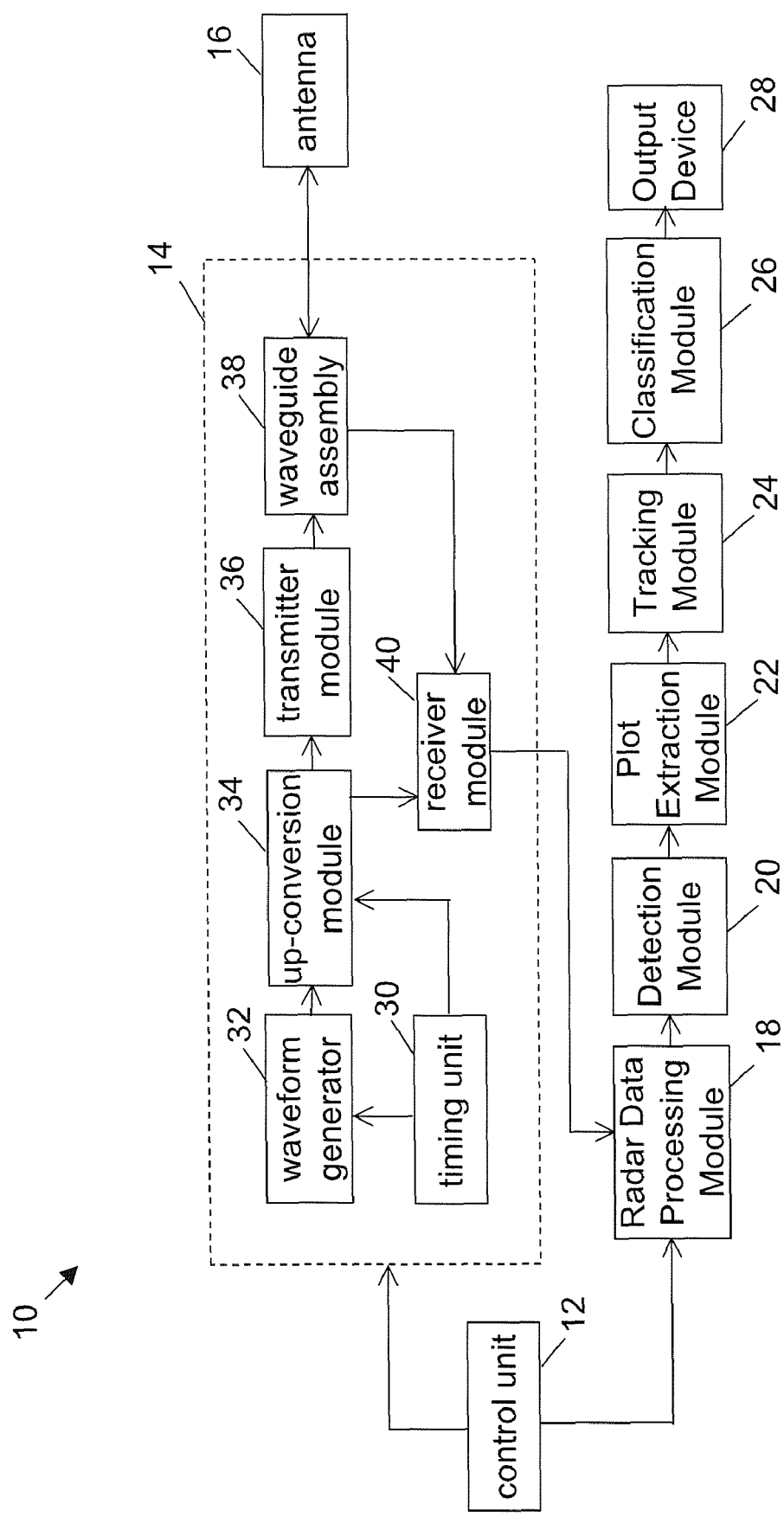
FIG. 1 is a block diagram of an exemplary embodiment of a radar system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

Referring now to FIG. 1, shown therein is a block diagram of an exemplary embodiment of a radar system 10. The radar system 10 includes a control unit 12, a transceiver 14, an antenna 16, a radar data processing module 18 and several downstream modules for further processing received radar data. These downstream modules include a detection module 20, a plot extraction module 22, a tracking module 24, a classification module 26 and an output device 28; those skilled in the art are familiar with the implementation of these modules. Modules 20-26 can be collectively referred to as a radar data processing unit, which processes the return signals and provides information on possible detected targets. The transceiver 14 includes a timing unit 30, a single waveform generator 32, an up-conversion module 34, a transmitter module 36, a waveguide assembly 38 and a receiver module 40. The waveform generator 32 and the up-conversion module 34 can be considered to be waveform generation circuitry, the transmission module 36 can be considered to be transmission circuitry and the waveguide assembly 38 can be considered to be coupling circuitry.

In alternative embodiments, the radar system 10 may have a different layout or configuration, including different components, as is commonly known by those skilled in the art. For example, the classification module 26 may be additionally, or optionally, connected to at least one of the detection module 20 and the plot extraction module 22 to classify detected targets. This allows target classification to be done at various stages of target tracking including during or after detection, plot extraction or track formation. In addition, there can be some embodiments in which the radar data processing module 18 provides detection functionality in which case there is no need for a separate detection module 20. Furthermore, in alternative embodiments, there can be an input module (not shown) that can be used by a user to provide an additional level of control to the radar system 10. Also, there may be some embodiments in which the radar data processing unit does not have each module shown in FIG. 1.

The control unit 12 controls the activity of the radar system 10 and although connections are shown only to the transceiver 14 and the radar data processing module 18, it is understood that the control unit 12 can generally provide control signals to other components of the radar system 10. In general, the control unit 12 provides control signals to the transceiver 14 for generating radar pulses to be transmitted via the antenna 16. The control unit 12 also provides control signals to the transceiver 14 for receiving return radar signals due to reflections of the transmitted radar pulses. The control unit 12 can also direct the activities of the remaining components of the radar system 10 to process the received return radar signals and provide information on any detected targets.

The waveform generator 32 generates a concatenated pulse waveform in the IF band. Various waveforms can be generated and the characteristics for these waveforms can be selected independently from one another as is described in further below. The up-conversion module 34 then up-converts the IF concatenated pulse waveform to a desired RF band for radar transmission such as, but not limited to, the L-band (i.e. frequencies of 1215 to 1350 MHz) and the S-band (i.e. frequencies of 2700 to 2900 MHz). The transmitter module 36 then amplifies the RF signals and generates transmission waveforms based on the up-converted concatenated waveforms. The transmitter module 36 can be a solid-state transmitter, a tube transmitter, or any other suitable transmitter. The waveguide assembly 38 then directs the amplified signals to the antenna 16 for transmission to the surveillance region. The antenna 16 can be a scanning antenna, a phased array antenna, or any other suitable antenna. After the radar pulses are transmitted, in the receive path, the waveguide assembly 38 receives reflections of the transmission waveforms sensed by the antenna 16 and directs return signals that are provided to the receiver module 40 which processes the return signals to separate reflections for each type of pulse in the concatenated pulse waveforms. The receiver module 40 generally provides filtering, amplification and down-conversion back to the IF band occurs to provide pre-processed digital radar data. The waveform generator 32, the up-conversion module 34, the waveguide assembly 38 and the receiver module 40 are described in more detail below with respect to FIGS. 6-8.

The radar data processing module 18 is typically implemented using a digital signal processor, as can several of the components that are downstream from the radar data processing module 18. Accordingly, the radar data processing module 18 includes at least one Analog-to-Digital Converter (ADC) and can perform further preprocessing such as pulse compression, range merging and the like to provide processed radar data. The processing performed by the radar data processing module 18 depends on the processing performed by the receiver module 40.

The detection module 20 then locates candidate targets from the processed radar data provided by the radar data processing module 18. Various techniques can be used for target detection as is commonly known by those skilled in the art. For instance, a Moving Target Indicator (MTI) or Moving Target Detector (MTD) detection technique can be used. Further noise reduction may be performed by the detection module 20 to enhance detection, using various techniques known to those skilled in the art.

The plot extraction module 22 receives and combines the candidate targets to form plots through a process known as plot extraction. The plot extraction module 22 filters the candidate targets to reject all of those candidate targets that do not conform to values that are expected for certain properties of the types of targets being detected such as, but not limited to, aircraft targets, non-aircraft targets and certain types of clutter.

The tracking module 24 receives the plots and generates tracks by accounting for the temporal variation of measurement information for candidate targets for a sequence of plots. More specifically, the tracking module 24 analyzes a sequence of plots and associates successive detections of a candidate target to form a track for the candidate target. Accordingly, the tracking module 24 can determine the movement of the candidate targets through the surveillance area.

The classification module 26 receives the tracks generated by the tracking module 24 and analyzes the tracks by measuring values for certain features of the tracks in order to classify the tracks as belonging to various different categories such as aircraft, birds, ground and weather clutter, environmental or geographical interference, etc. Another classifier may be trained for particular aircraft or non-aircraft targets and applied to the output of the classification module 26 to extract particular targets from aircraft or non-aircraft outputs. For instance, the non-aircraft class can be expanded to include birds, windmills, AP, etc. The aircraft class can be expanded to include helicopters, UAV, light aircrafts, etc. Alternatively, the classification module 26 may be trained to identify each of these sub-classes of the aircraft and non-aircraft classes.

The output device 28 can provide information on the targets that are being tracked by the radar system 10. The output device 28 can be a monitor, a printer or other suitable output means. The output device 28 can receive classified tracks from the classification module 26 and provide output information on the classified tracks. In other embodiments, the output device 28 can receive information from other components of the radar system 10 and output this information.

The radar system 10 can be used to simultaneously achieve a desirable range coverage between a minimum and maximum range, while satisfying range resolution performance requirements using a low-cost, low peak-power transmitter. The type of pulses used in the concatenated waveforms described herein result in low peak power since the power of the pulses are spread over the length of the pulses. The low peak power then allows for the use of transistors in various hardware components of the radar system which results in low cost. Furthermore, all of the reception hardware can be implemented in one unit which helps to reduce cost. Redundancy can then be inexpensively achieved by adding similar reception components in a second unit. The radar system 10 can also utilize frequency diversity in one Pulse Repetition Interval (PRI) to get a 3 dB improvement in the Signal-to-Noise (SNR) ratio of the processed radar data. Exemplary waveforms that can be used to achieve these specifications are first discussed, followed by exemplary hardware implementations for components in the transceiver 14 that can be used to generate or process these waveforms.

The concatenated pulse waveforms described herein generally comprise pulses with a certain order within a given Pulse Repetition Interval (PRI) for pulses that are used to detect targets at various ranges from the radar site. Pulses of different lengths are ordered in such a way to provide a "fill" for a blanking interval. For instance, when a long pulse (LP) having a length of 120 μs is transmitted, this time corresponds to a range of about 10 nmi which is being blocked during the transmission of the LP. Accordingly, to detect targets that are within 10 nmi of the radar, a shorter pulse can be transmitted after the LP has been transmitted in the same PRI. For instance, a medium pulse (MP) can be transmitted after the LP has been transmitted as shown in FIG. 2A. The MP will also block some of the return signals but the return signals will be blocked over a shorter range since the MP is shorter than the LP. To fill in a portion of the returns that are blocked by the MP, a short pulse (SP) can be transmitted after the MP as shown in FIG. 2B. These three pulses can be transmitted in the same PRI. Therefore, if the minimum range is to be extended below a certain value, the concatenated pulse can have a SP at the end that is short enough to achieve this minimum range value. Since the SP already has a short time duration, pulse compression does not need to be used, whereas it can be used for the other pulses as is described in more detail below.

Further variations on the concatenated pulse waveforms shown in FIGS. 2A and 2B are possible. Since these pulses are separated in frequency, which is described in more detail below, values for parameters for these pulses can be selected somewhat independently from one another. For instance, any modulation can be applied to one of the pulses irrespective of the modulation applied to the other pulses. Frequency diversity is also possible as is described in more detail below.

Referring now to FIG. 3A, shown therein is an illustration of an exemplary concatenated pulse waveform 50 that can be produced by the radar system 10. Specific numbers are given for exemplary purposes but it should be understood that other values can be selected for the IF and RF frequencies of these pulses as well as different time lengths. These values can be tailored to a particular application which specifies a minimum range, a maximum range, a range resolution, and frequency and power operating parameters. The waveform 50 includes four pulses of varying lengths concatenated into a single PRI. This four-pulse waveform can be transmitted every PRI. Alternatively, different concatenated pulse waveforms can be set in different PRIs. The pulses are also transmitted at different frequencies which allows for efficient processing of the reflections of these pulses in the receiver module 40.

The two long pulses (LPs) 52 and 54 have lengths that are used to optimize target detection over the entire coverage volume. The two medium pulses (MPs) 56 and 58 have lengths that are used to optimize target detection over short ranges. For example, the MPs 56 and 58 can be 22 μs long for near range coverage from about 5 nmi. The LPs 52 and 54 do not have to have the exact same length, and the two MPs 56 and 58 do not have to have the exact same length. However, different lengths within a given class or type of pulse (i.e. LP or MP) will affect some downstream processing stages such as pulse compression if it is used.

While these particular MPs have a transmitted length of 22 μs, they can be shaped before transmission so that their energy content is equivalent to a 20 μs pulse. The LPs 52 and 54 can be 120 μs "long" pulse (LP) and used for far range coverage up to 200 nmi. In a similar manner to the MPs 56 and 58, the LPs 52 and 54 can be shaped to reduce their energy content to the equivalent of an unshaped 110 μs pulse. Any type of pulse shaping can be used with the concatenated pulses described herein. The pulse shaping reduces spurious frequencies during transmission and also eases the filtering requirements of the receiver module 40.

The two LPs 52 and 54 are transmitted at frequencies offset by a different amount from a carrier frequency so that they can be separated in the receiver module 40. The two MPs 56 and 58 are also transmitted at frequencies offset from a carrier frequency so that they can be more easily separated in the receiver module 40. The pulses of a given type are transmitted at different frequencies to achieve frequency diversity in one PRI; i.e. each of the two LPs 52 and 54 and MPs 56 and 58 are repeated offset from different carrier frequencies (F1 and F2) to achieve frequency diversity gains. One set of pulses includes LP 52 and MP 58, another set of pulses includes LP 54 and MP 56. However, the carrier frequencies associated with the pulses (i.e. F1 and F2) can be selected differently such that one set of pulses includes LP 52 and MP 56 and the other set of pulses includes LP 54 and MP 58. In this example, the offset is from the carrier frequency (Fc) is +/−3 MHz; i.e.

the MPs 56 and 58 are transmitted at Fc−3 MHz and the LPs 52 and 54 at Fc+3 MHz with different Fc selected for a given type of pulse. Thus, in this example, the concatenated waveform contains energy centered about four different frequencies. It should be noted that the pulses do not have to be centered about the carrier frequency, although this simplifies the generation of these pulses and the processing of reflections of these pulses.

It should be noted that carrier frequency diversity does not have to be achieved for both LPs and MPs. For instance, a concatenated waveform can be generated such that there are two LPs and one MP. In this case one set of pulses includes a LP1 and a MP and another set of pulses includes a LP2 that is at a different RF frequency from LP1 to achieve frequency diversity. This can also be applied to MPs so that the first set has a LP and a MP1 and the second set has a MP2 at a different RF frequency from MP1. In addition, an additional set of pulses can be used for further frequency diversity. It should be noted that a set of pulses, as defined herein, can include just one pulse.

Taking timing and particular frequencies into consideration, for this example, the first LP 52 is transmitted at F1+3 MHz (i.e. Fc=F1). A 5 μs gap follows the LP 52 to permit a LO in the up-conversion module 34 to switch frequencies. The second LP 54 is transmitted at F2+3 MHz (i.e. Fc=F2) followed by another 5 μs gap. The first MP 56 is transmitted at F2−3 MHz (i.e. Fc=F2). This 5 μs gap between the second and third pulses can be used to ensure that all pulses have identical shaping. Shaping can be applied to each pulse as described in further detail below to reduce the effective energy of each pulse. The MP 58 is transmitted at F1−3 MHz (i.e. Fc=F1) following a 5 μs gap after the third pulse 56. These gaps also allows the circuitry in the transmitter module 36 to be turned on and off gently (i.e. to avoid large transients).

FIGS. 3B-3D illustrate how the concatenated pulse waveform 50 can be generated. The LPs 52 and 54 can be generated at a similar IF since they are transmitted with the same offset with respect to the carrier frequencies F1 and F2. In this example, the LPs 52 and 54 can be generated at 27 MHz. Similarly, the MPs 56 and 58 can be generated at a similar IF since they are transmitted with the same offset with respect to the carrier frequencies F1 and F2. Accordingly, each type of pulse is generated at a different IF. The pulses 52-58 are generated with a particular timing, an example of which was noted above. Local oscillator frequencies can then be generated and switched between, with appropriate timing (as shown in FIG. 3C), to translate the center frequencies of the pulses 52-58 to desired transmission frequencies. The first LP 52 is mixed with local oscillator frequency LO1, the second LP 54 and the first MP 56 are then mixed with local oscillator frequency LO2, and the final MP 58 is mixed with local oscillator frequency LO1. FIG. 3D shows the concatenated pulse waveform 50 in time and frequency. A first set of pulses including the LP 52 and the MP 58 are associated with center frequency Fc=F1, and a second set of pulses including the LP 54 and the MP 56 are associated with center frequency Fc=F2. The separation between the two Fcs allows receiver filters to effectively isolate returns from the pulses into two groups.

Three criteria can be used to determine the minimum range that can be achieved with the concatenated pulse waveform 50. First, each of the four pulses in the concatenated pulse waveform 50 can be processed with optimum fidelity only when an entire reflected pulse has been received. Second, the radar returns from each frequency for a given pulse length is combined, so processing for a given pulse length begins when both frequencies of that reflected pulse have been received. Third, additional data can be collected before the minimum range where targets are declared, as is known by those skilled in the art, in order to improve any downstream detection processing such as CFAR processing. Using the exemplary numbers above, the time required to receive radar reflections for the two MPs 56 and 58 is about 49 μs, and the time used to collect additional data for improved detection performance can be on the order of 12 μs. The total time is 61 μs, which translates to a 5 nmi minimum range. Other timing can be chosen to achieve a different minimum range.

The duration of the LPs 52 and 54 increase the minimum pulse repetition interval. With the exemplary numbers given above, the minimum PRI is increased to 2,718 μs. The PRI can be staggered to combat range ambiguity. Any suitable stagger sequence can be used. For example, the waveform-to-waveform timing can be rotating staggers over three five-waveform coherent processing intervals (CPIs) with different pulse repetition intervals (PRIs), for example 2,718 μs, 3,118 μs and 3,597 μs.

As shown, the LPs and MPs are generated with a certain IF separation with respect to one another (in this example 6 MHz) to minimize spectral occupancy while permitting separation of the two types of pulses. This also results in efficient demodulation of received reflections of the pulses. However, the spectrum of an unshaped, pulsed Non-Linear Frequency Modulated (NLFM) waveform naturally extends beyond the chirp frequency range due to square wave windowing, and spectral data associated with a LP has energy within the spectra of a MP. However, this energy is indistinguishable from the expected MP energy so it is difficult to exclude this energy from receive paths in the receiver module 40 for MP reflections using simple frequency-domain filtering techniques. This can be an issue depending on the frequency separation between the LP and the MP in a given pair of pulses. When the frequency separation is small such that leakage becomes an issue, a modulation sweep can be used to minimize energy leakage between the MP and LP components grouped around a single Fc. To address this issue, the shape of the rising and falling edges of each pulse can be selected to reduce leakage components. The waveform shaping reduces the pulse energy available from a square pulse. This shaping yields reductions in the leakage between receiver paths by modifying the windowing function and reduces the spectral energy leaking into adjacent receiver path passbands. In particular, a shaping function can be selected to reduce the energy leaking from the LP into the MP to the noise floor.

The reflected radar pulses can be compressed after reception to meet the goal of a minimum range separation performance to help distinguish between different targets. This procedure is commonly known to those skilled in the art. If short pulses are used, they may not have to be compressed; this is dictated by the resolution of the radar system. The pulses 52-58 can also be non-linear frequency modulated to maximize sensitivity while reducing range sidelobes. Other types of modulation can also be applied to the pulses 52-58 and the modulation used for each type of pulse can be selected independently from one another. Some examples of different types of modulation that can be used include, but are not limited to, linear frequency modulation, phase modulation, digital modulation, coded modulation, and continuous wave modulation. In addition, as mentioned, each pulse can be shaped prior to transmission to suppress interference between receiver pathways. However, modulation is optional and pulse shaping may not be needed for all types of concatenated pulse waveforms.

Figure 5A:
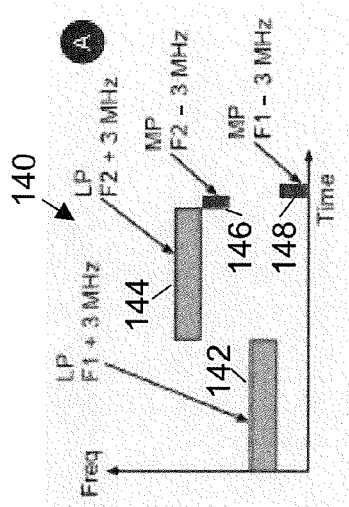
FIGS. 5A-5G are plots of waveforms at various points in the receiver processing structure of FIG. 4.
Figure 5B:
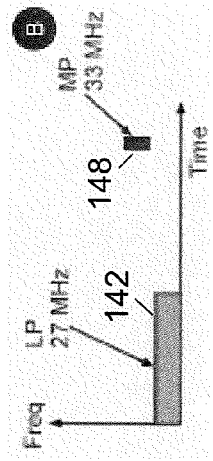
Figure 5C:
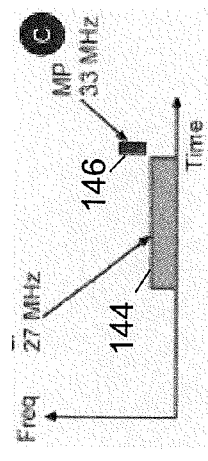
Figure 4:
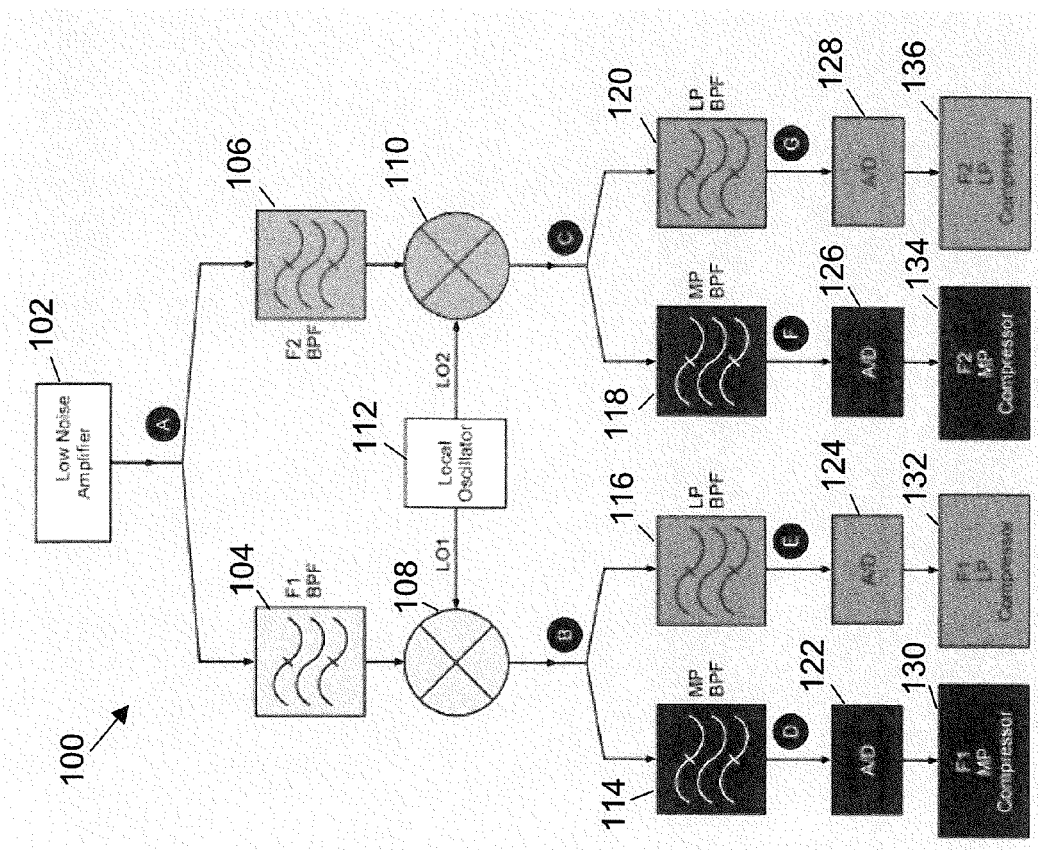
FIG. 4 is a block diagram of an exemplary embodiment of a portion of a radar system for performing receiver processing on the concatenated pulse waveform of FIG. 3A.
Figure 5D:
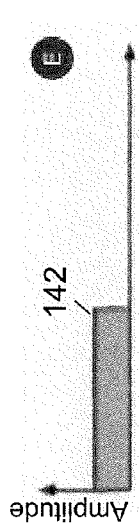
Figure 5E:
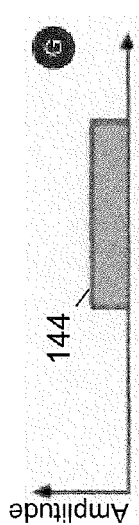
Figure 5F:
Figure 5G:

Referring now to FIG. 4, shown therein is a block diagram of an exemplary embodiment of a portion of a radar system 100 for performing receiver processing on radar returns 140 based on reflections of the concatenated pulse waveform 50. The radar return 140 is first amplified by a low-noise amplifier 102, which typically produces an output with time-frequency components as shown in FIG. 5A. Bandpass filters 104 and 106 then separate the output of the low-noise amplifier into F1 and F2 based frequency components. The bandwidth of the bandpass filter 104 is large enough so that its output includes the frequency components of the reflected LP 142 and the reflected MP 148 while the bandwidth of the bandpass filter 106 is large enough so that its output includes the frequency components of the reflected LP 144 and the reflected MP 146. The mixers 108 and 110 then down-convert the output of the filters 104 and 106 respectively to the IF band based on oscillation frequencies LO1 and LO2 respectively that are provided by a local oscillator 112. The time-frequency outputs of the mixers 108 and 110 are shown in FIGS. 5B and 5C. The reflected MP waveform 148 is then separated from the reflected LP waveform 142 by the bandpass filters 114 and 116 as shown in FIGS. 5D and 5E. The reflected MP waveform 146 is separated from the reflected LP waveform 144 by the bandpass filters 118 and 120 as shown in FIGS. 5F and 5G. The separated reflected waveform components are then digitized by analog to digital converters 122-128 and pulse compression is then performed by pulse compressors (i.e. matched filters) 130-136. The waveform processing uses the IF spectral frequency separation of the reflected LP waveforms 142 (144) and the reflected MP waveforms 146 (148) to separate reflections of the two pulses about each Fc and to eliminate the need for a quad analog receiver implementation.

The use of pulse compression allows for the energy on target that is necessary for target detection up to a range of 200 nmi from a low-cost, low-peak-power transmitter. The digital pulse compression uses a matched filter to integrate energy received from a target over time, allowing a long duration, low peak-power pulse to replace a short, higher peak-power pulse. The pulse compression used also allows for the range resolution to be maintained even though long duration pulses are used. The radar data processing module 18 can perform the pulse compression before any detection is performed by the radar system 10.

The digitized reflected MPs and LPs can be compressed to a desired width by the pulse compressors 130-136. The different pulse lengths require separate compressors to optimize a matched filter to each pulse length. The use of pulse compressors provides gains in signal-to-noise ratio as a long-duration input pulse is integrated into a short-duration output pulse. However, when the compressor is only partially filled by the input pulse its output is often nonzero and forms range sidelobes. NLFM waveforms can be used to generate low sidelobes. However, additional processing, such as coefficient shaping and optimized pulse compressor sampling rates can be used to further reduce sidelobes.

Coefficient shaping can provide an improvement in the range sidelobes that are a natural byproduct of pulse compression, but are at the expense of a small broadening of the mainlobe. While coefficient shaping reduces the mainlobe amplitude slightly, the noise is attenuated by a similar amount to achieve a constant SNR for moderate shaping. Thus, coefficient shaping does not sacrifice compression gain.

When the pulse compressor sample rate is selected to undersample reflected waveforms, significant range sidelobes result. Accordingly, the pulse compressor sample rate is selected to ensure that the waveform is properly sampled by meeting or exceeding the Nyquist rate based on the waveform bandwidth. Appropriate sample rates can improve the range sidelobe performance of a pulse compressor. To eliminate downstream resampling effects, the pulse compressor sample rates can be selected to be integer multiples of the output data rate. The data can also during pulse compression to reduce downstream processing load and system cost.

For example, compression can be implemented so that compressed reflected LP radar data has a peak sidelobe ratio of −60 dBc, while the compressed reflected MP radar data has a peak sidelobe below −50 dBc. With a radar system dynamic range of greater than 70 dB, the low sidelobe levels mean that, for most targets within the dynamic range, virtually no sidelobes should be present in the digitized radar data stream after pulse compression.

Using the exemplary waveform parameters given previously, the frequency separation of 6 MHz allows for realizable analog filter implementations for filters 114-120 for effectively separating the MP and LP components. The filters 114-120 can be implemented as Butterworth bandpass filters. A digital low pass filter section can be used after digitization to provide additional frequency separation prior to pulse compression.

The transmission of the LPs before the MPs occurs with certain timing to allow for the reception of reflections of the MPs for possible short range targets prior to the reception of reflections of the LPs for possible longer range targets. Also, ordering the longer pulses before the shorter pulses allows for filling in the blanking intervals as described earlier. Furthermore, when reflections of the pulses are received, the reflections are colored by the frequency of transmission. Since the initial transmission time of these pulses are known, the reflections can be range-aligned for further processing.

The waveform generator 32 is a single digital device that is capable of producing each of the pulses that are used in the concatenated pulse waveform employed by the radar system 10. The waveform generator 32 can generate a digital IF concatenated pulse waveform from preprogrammed 14-bit digital samples. A DSP that is capable of producing waveforms at a sufficient IF can be used to implement the waveform generator 32. The digital IF concatenated pulse waveform is then converted to the analog domain using a high-speed digital-to-analog converter (not shown) with adequate resolution and speed. For instance, a 14 bit digital-to-analog converter operating at 264 MHz can be used. This high output rate reduces the cost and complexity of filters used in the up-conversion module 34.

Since the waveform generator 32 creates the pulses for the concatenated pulse waveform at the IF band, this simplifies the implementation of the up-conversion module 34 in that only one mixer is required to up-convert the concatenated pulse waveform to the RF band. The waveform generator 32 can generate various types of concatenated waveforms. In general, the concatenated pulse waveform can have combinations of short, medium and long pulses. From a frequency diversity point of view, the concatenated pulse waveform can also have different groups of pulses, i.e. the waveform 50 has two pairs of pulses but in other cases, a triplet or quadruplet of pulses can be used for transmission at different Fcs for frequency diversity purposes (in this case there would be more receiver paths in the receiver module 40 and a corresponding increase in the number of LO frequencies used in the up-conversion module 34 when more carrier frequencies Fc are used). The waveform generator 32 can also create short pulses (SPs) in addition to the LPs and MPs already discussed, and can create two, three, four or more sets of pulses associated with different carrier frequencies in the same PRI. The waveform generator 32 can create concatenated pulses in which SPs follow LPs with no MPs. The waveform generator 32 can also generate each set of pulses to have two or more pulses of different lengths in the given PRI. In general, the lengths are selected to detect at least two of: targets at short range, targets at medium range and targets at long range with respect to an installation site of the radar system. Furthermore, since IF and RF frequency is used to discriminate between these pulses, the waveform generator 32 allows one to separately and independently set various characteristics for each type of pulse such as pulse length, pulse IF, whether modulation is used during pulse generation and if so the type of modulation, whether pulse shaping is applied during pulse generation and if so the type of pulse shaping, and set various timing intervals for the pulses in the concatenated pulse waveform.

The various parameters that can be used by the waveform generator 32 to generate the concatenated waveform can be provided as a selection input to the waveform generator 32. The selection input can be a parameter file that is stored in a data store (not shown) associated with the radar system 10 and which is accessed by the waveform generator 32 or the control unit 12 during operation. Alternatively, or in addition to, a user may be able to input any of these parameters to the radar system 10 through an input module (not shown). In general the selection input allows the following parameters to be set: i) the number of the sets of pulses, ii) the number of the pulses in each of the sets of pulses, iii) the length of the pulses in each of the sets of pulses, iv) the carrier frequency associated with each of the sets of pulses, v) the frequency of the pulses in each of the sets of pulses, vi) a modulation function to modulate the pulses in each of the sets of pulses, vii) a shaping function to shape the pulses in each of the sets of pulses, viii) gap lengths used between the pulses in each of the sets of pulses and ix) a frequency diversity factor to specify which of the sets of pulses have pulses for frequency diversity. The frequency diversity factor specifies the amount of frequency diversity that is used in the concatenated pulse waveform. For instance, full frequency diversity can be specified in which the sets of pulses include the same type of pulses at different frequencies. The frequency diversity factor can also be set to change the amount of frequency diversity; for instance frequency diversity may only be applied to one pulse from each set of pulses as explained previously. Further, for frequency diversity, the length of similar pulses in different sets of pulses (i.e. LPs 52 and 54 from FIG. 3A) do not have to be identical. The selection input can also allow one to set the amount of power of each pulse by specifying the length and average power of each pulse. This affects the amount of transmitted power, which can be defined by the range of the surveillance region and the power specification of the transmitter module 36.

The concatenated waveforms that are generated by the waveform generator 32 allow more PRIs over a given radar antenna beamwidth and a given rotation rate, when compared with separated pulses. These concatenated waveforms also allow for more return signals to be obtained over a fixed time interval. Both of these features are a result of the temporal ordering of pulses within a given PRI. The concatenated pulse waveform uses the time in a given PRI more effectively since shorter pulses are transmitted right after the longer pulses have been transmitted. This allows for the reception of more radar return data.

In at least some cases, the waveform generator 32 can use a non-linear frequency modulation (NLFM) function for the pulses that are generated for the concatenated pulse waveform. The use of NLFM enables an efficient hardware implementation for pulse compression. The NLFM function can be selected to rapidly sweep through the frequency components furthest from the center frequency for each pulse. The NLFM functions used can be similar for the long and medium pulse widths, but a higher rate of change can be utilized in the medium pulses to accommodate the shorter time period. This modulation scheme can provide good sidelobe control with minimum bandwidth occupancy while allowing sufficient bandwidth for range resolution requirements. A similar modulation function can be used for each pulse type while different modulation functions can be used for different pulse types.

In addition, the waveform generator 32 can shape the leading and trailing edges of each pulse in the concatenated pulse waveform by using a shaping function to minimize spectral bandwidth. The shaping function can attenuate the out-of-band components that would be generated with a simple gated pulse. As previously mentioned, the shaping can minimize the amount of leakage between the LP and the MP frequency bands. The dominant leakage is typically from the LP band to the MP band since the LP typically contains more energy.

Figure 6:
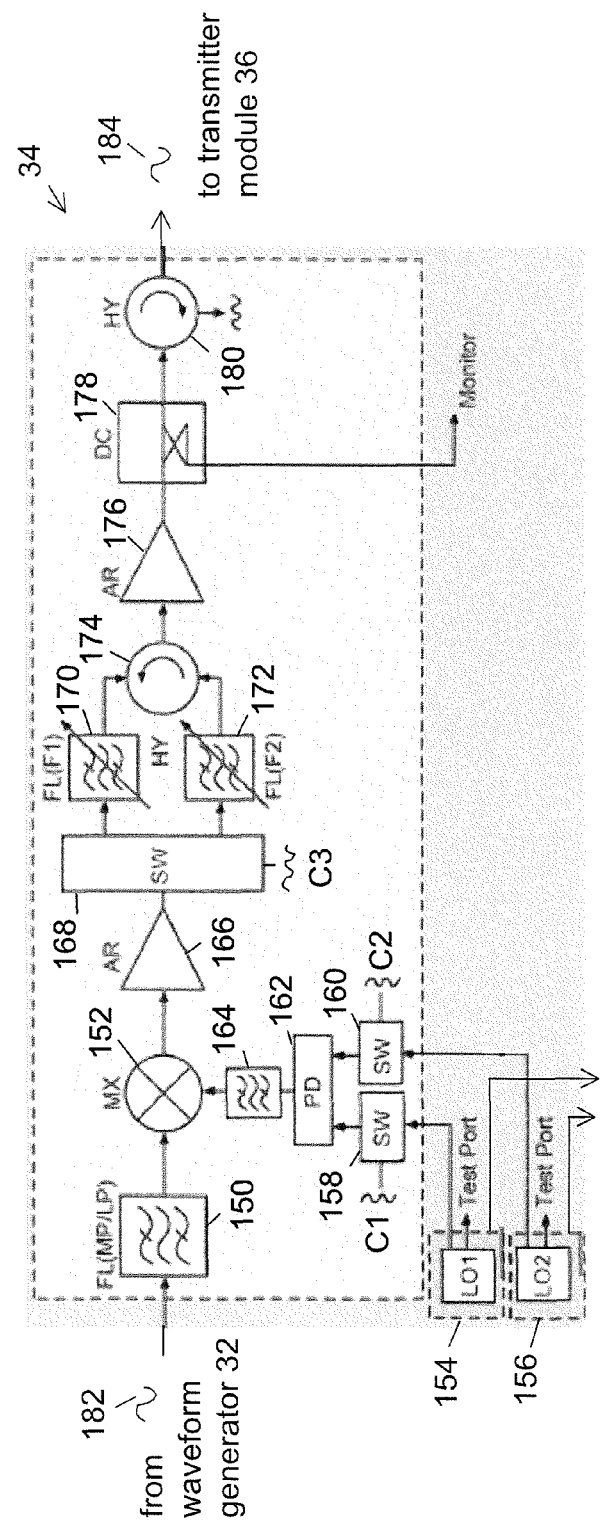
FIG. 6 is a block diagram of an exemplary embodiment of an up-conversion module that can be used by the radar system of FIG. 1.

Referring now to FIG. 6, shown therein is a block diagram of an exemplary embodiment of the up-conversion module 34. The up-conversion module 34 up-converts the IF concatenated pulse waveform 180 provided by the waveform generator 32 to a desired RF band for radar transmission such as the L-band or the S-band, for example. The up-conversion module 34 can include two excitation channels for redundancy. Only one of the excitation channels is shown and described. The up-conversion module 34 includes a bandpass filter 150, a mixer 152, local oscillators 154 and 156, switches 158 and 160, a power divider 162, and a filter 164. It should be noted that rather than having two local oscillators 154 and 156, a single selectable local oscillator may be used which can switch between the oscillation frequencies LO1 and LO2 according to a timing pattern based on the concatenated pulse waveform. In this case, the switches 158 and 160 and the power divider 162 are not required. The up-conversion module 34 further includes an amplifier 166, a switch 168, two tunable bandpass filters 170 and 172, a circulator 174, an amplifier 176, a directional coupler 178 and an isolator 180. The directional coupler 178 is optional and can be used to provide a test point to monitor the functioning of the up-conversion module 34. It should be noted that other configurations for the up-conversion module 34 are possible. The filter 150 can be considered to be a first filter stage. Components 152 and 158-166 can be referred to as a mixing stage; local oscillators 154 and 156 may be included or may be external to the mixing stage and the up-conversion module 34 for that matter and simply provide the oscillation signals LO1 and LO2. The components 168 to 174 can be considered to be a second filter stage, and the components 176 to 180 can be considered to be an output stage. In some cases, not all of these components have to be used.

The up-conversion module 34 receives the IF concatenated pulse waveform 182 from the waveform generator 32 and filters the waveform via the bandpass filter 150. The bandpass filter 150 is centered on the IF frequencies used in the IF concatenated pulse waveform 180 to reject any spurious signals components due to digital quantization. The output of the bandpass filter 150 is then sequentially mixed with oscillation frequencies LO1 and LO2 from oscillators 154 and 156 to generate two sets of L-band MP and LP waveforms. The oscillation frequencies and the frequency separation between the pulses in the concatenated pulse waveform are selected so that the closest unwanted mixer products are far enough from the transmission frequencies to avoid mixer product interference.

Using the exemplary concatenated waveform of FIG. 3A, an example of the timing of the sequential mixing is given in FIG. 3C. The switches 158 and 160 switch between the oscillation signals LO1 and LO2 from the local oscillators 154 and 154 according to the timing requirements. The timing unit 30 can provide control signals C1, C2 and C3 to control the switching of the switches 158, 160 and 168. The outputs of the switches 158 and 160 are then combined by passing these outputs through the power divider 162 in the reverse direction. The output of the power divider 162 is filtered by the filter 164 to remove any spurious frequency components. In some embodiments, the functionality of the timing unit 30 can be provided by the control unit 12.

Figure 9A:
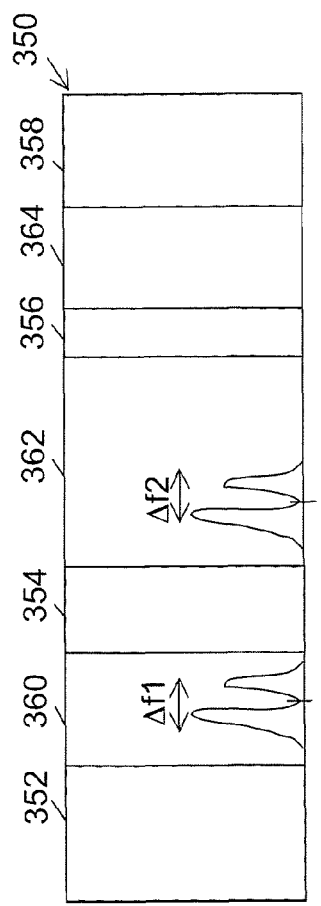
FIGS. 9A, 9B and 9C are illustrations of the frequency components of a concatenated pulse waveform generated by the radar system of FIG. 1 and an exemplary blocking profile.
Figure 9B:
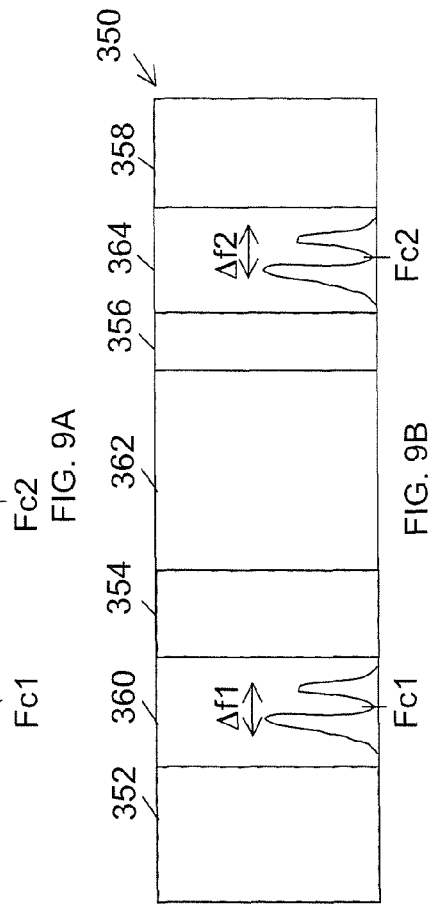
Figure 9C:
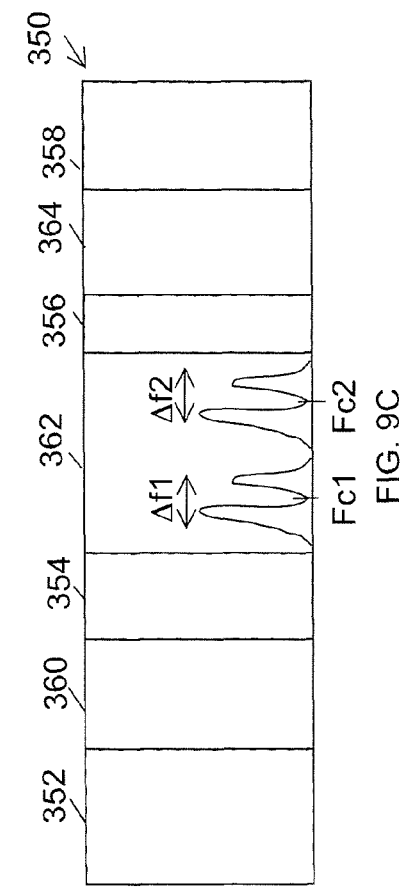

The LPs 52 and 54 are at frequencies F1 and F2, respectively, which are separated by about 30 MHz or more (this frequency separation is variable and can be set to accommodate various blocking patterns as is discussed in more detail with respect to FIGS. 9A, 9B and 9C). In each set of medium and long pulses, the MPs are also offset from the LPs frequencies by a certain amount (6 MHz in this example) to ensure clean filtering/separation of the short and long pulses. This is a cost effective method of achieving dual frequency diversity in a single excitation channel.

The up-converted waveforms are then amplified by the amplifier 166 and switched by the switch 168 to the two separate tunable bandpass filters 170 and 172. The timing unit 30 can provide a control signal C3 to control the switching of the switch 168 according to the timing requirements of the waveform 182. The bandpass filters 170 and 172 are configured to reject spurious leakage components from the mixer 152 and the local oscillators 154 and 156. The outputs of the bandpass filters 170 and 172 are then combined via the circulator 174 and amplified by the amplifier 176. The directional coupler 178 and the isolator 180 at the output of the amplifier 176 are used for output power level monitoring and reverse power protection.

The transmitter module 36 is implemented with a suitable wideband transmitter. This allows for the use of one transmitter which can transmit all of the RF frequencies for the various combinations of concatenated pulse waveforms and does not have to be tuned. The transmitter module 36 can be implemented using known components to meet the requirements of the concatenated pulse waveform. Alternatively, the requirements of the concatenated pulse waveform can be modified, such that the concatenated pulse waveform still meets the range requirements of the radar system but allows for the relaxation of the power requirements of the transmitter module 36. For instance, if the concatenated pulse waveform is too long, then the transmitter module 36 may have trouble handling the power requirements. Accordingly, the length of the concatenated pulse waveform can be chosen so that the maximum power required by the transmitter module 36 is at a safe level.

Figure 7:
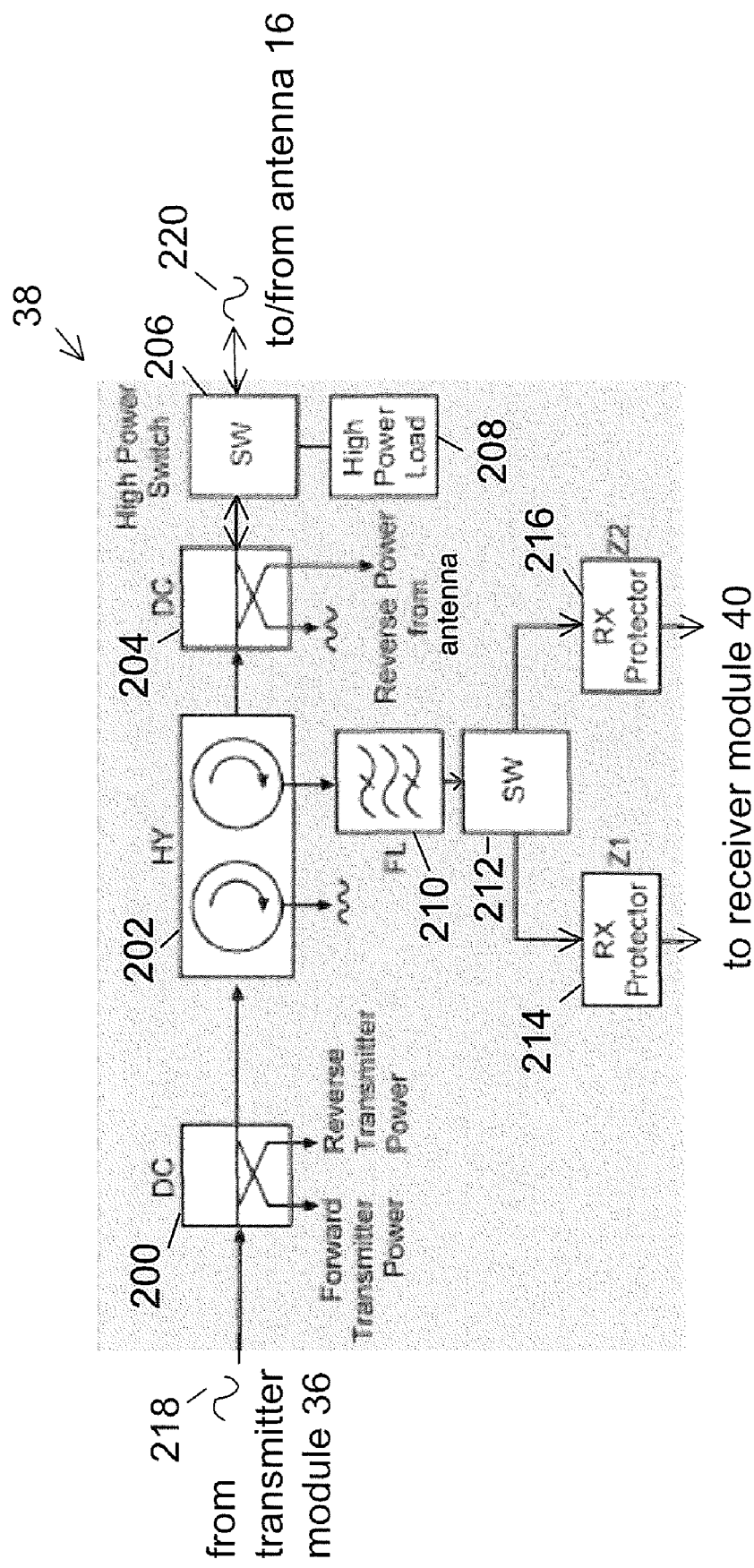
FIG. 7 is a block diagram of an exemplary embodiment of a waveguide assembly that can be used by the radar system of FIG. 1.

Referring now to FIG. 7, shown therein is a block diagram of an exemplary embodiment of the waveguide assembly 38. The waveguide assembly 38 includes components that are rated to handle the range of RF power that is provided by the transmitter module 36. The waveguide assembly 38 includes a bidirectional coupler 200, a duplexer 202, a directional coupler 204, a switch 206, a high power load 208, a bandpass filter 210, a switch 212 and RX protectors 214 and 216. Two or more RX protectors can be used when there are two or more redundant channels in the receiver module 40. Otherwise if there is only one receiver channel, then only one RX protector is needed and the switch 212 is not required. When there is more than one receiver channel, the control unit 12 can control the switch 212 based on the receiver channel that is enabled in the receiver module 40.

The bidirectional coupler 200 monitors the transmission power of the signal 218 provided by the transmitter module 36 and the reverse power from the duplexer (circulator) 202. The duplexer 202 is a high-power duplexer that directs transmitted signals to the antenna 16 and any return signals to the receiver path. The duplexer 202 provides high isolation between the receiver module 40 and the transmitter module 36. The transmitted signals are then sent from the duplexer 202 through the directional coupler 204 to the switch 206, which is a high-power switch. The switch 206 either directs the transmitted signals to the antenna 16 or to the high-power load 208. The directional coupler 204 before the switch 206 monitors reverse power from the antenna 16 for any dangerous conditions.

The return signals from the antenna 16 enter the waveguide assembly 38 through the switch 206 and pass through the directional coupler 204 to the duplexer 202. The duplexer 202 directs the return signals through the bandpass filter 210 to reject out-of-band interference and prevent intermodulations in the receiver module 40. The bandpass filter 210 can also be used to ensure that the transceiver 14 meets National Telecommunications and Information Administration requirements for receiver susceptibility. The switch 212 is a low-power, low-loss switch that directs the return signals to one of the two redundant receiver channels in cases where the receiver module 40 includes two redundant receiver channels. In these cases, upon a failure being reported in the selected receiver channel, the switch 212 can be controlled to redirect the return signals to the other redundant receiver channel. The receiver protectors 214 and 216 are provided at the output of the waveguide assembly 38 to prevent excessive power spikes from damaging the receiver module 40.

Figure 8:
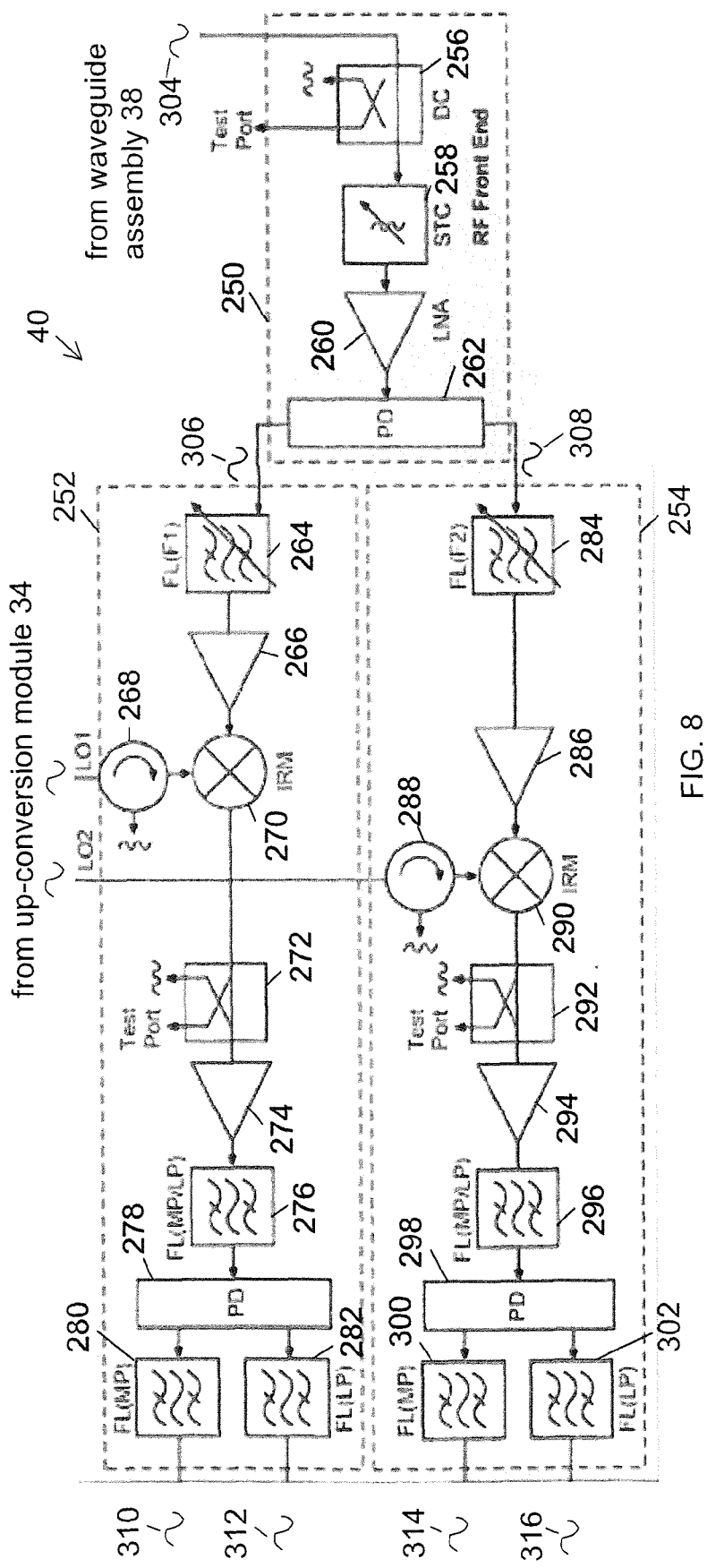
FIG. 8 is a block diagram of an exemplary embodiment of a receiver module that can be used by the radar system of FIG. 1.

Referring now to FIG. 8, shown therein is a block diagram of an exemplary embodiment of the receiver module 40. The receiver module 40 includes an RF front-end 250 and two down-converters 252 and 254. The RF front-end 250 includes a directional coupler 256, a sensitivity time control (STC) attenuator 258, a low noise amplifier (LNA) 260, and a power divider (PD) 262. The down-converter 252 includes a bandpass filter 264, an amplifier 266, a circulator 268, an image-reject mixer 270, a directional coupler 272, an amplifier 274, a bandpass filter 276, a power divider 278, and bandpass filters 280 and 282. The down-converter 254 includes a bandpass filter 284, an amplifier 286, a circulator 288, an image-reject mixer 290, a directional coupler 292, an amplifier 294, a bandpass filter 296, a power divider 298, and bandpass filters 300 and 302. Accordingly, the receiver module 40 supports dual-frequency diversity operation and the general format of the concatenated pulse waveform shown in FIG. 3A. However, if more carrier frequencies are used in the concatenated pulse waveform, then the receiver module 40 can be altered to include more down-converters at the required frequencies to match the particular format of the concatenated pulse waveform.

The receiver module 40 is a high dynamic range, low-noise receiver that mixes return signals with oscillation frequencies LO1 and LO2 from oscillators 154 and 156 in the down-converters 252 and 254 to recover the two sets of MPs and LPs at IF frequencies. The receiver module 40 can also contain two identical receiver channels for redundancy; only one receiver channel is shown in FIG. 8 and will be described. Only one of the two channels needs to be selected and active at any given time in order for the radar system 10 to remain operational. Furthermore, if either the RF front-end 250 or one of the down-converters 252 and 254 requires maintenance in one particular channel, that channel can be temporarily powered down for replacement after ensuring that the alternate channel is selected and active.

The RF front-end 250 interfaces with the waveguide assembly 38 to receive return signals 304. The directional coupler 256 provides an access point for injecting a test signal for receiver testing and fault isolation. The (STC) attenuator 258 is programmable and is used to prevent the return signals 304 from saturating the LNA 260 and to ensure that the receiver module 40 remains in its linear operating range. The LNA 260 helps to maintain a low overall receiver noise figure (for example, 3 dB) and increases the signal level to the power divider 262, which provides pre-processed return signals 306 and 308 to the two down-converters 252 and 254 respectively. The STC attenuator 258 and the LNA 260 can be implemented to ensure that the receiver module 40 has an acceptable dynamic range. The STC attenuator 258 and the LNA 260 can be considered to be a gain control stage that adjusts the level of the return signals.

The down-converters 252 and 254 process the pre-processed return signals to provide first and second filtered waveforms corresponding to reflections of pulses associated with the first and second sets of pulses. The down-converter 252 includes the tunable bandpass filter 264 for frequency components associated with carrier frequency F1 and the second down-converter 254 includes the tunable bandpass filter 284 for frequency components associated with carrier frequency F2. The amplifiers 266 and 286 respectively amplify the filtered received signals. The filters 264 (284) and the amplifier 266 (286) can be referred to as a first filter stage. The down-converter 252 uses the Image-Reject Mixer (IRM) 270 to mix the amplified signal associated F1 with the oscillation frequency LO1. Likewise, the down-converter 254 uses the Image-Reject Mixer (IRM) 290 to mix the amplified signal associated F2 with the oscillation frequency LO2. The IRMs 270 and 290 down-convert the signal to IF for each pair of MP and LP. The IRMs 270 and 290 help reduce image noise to improve SNR. The isolators 268 and 288 prevent crosstalk between the two down-converters 252 and 254 (i.e. prevents the return signals at F1 from leaking into the components of the down-converter 254 and vice-versa). The directional couplers 272 and 292 at the output of the IRMs 270 and 290 provide an access point for injecting a signal for testing and fault isolation. Accordingly, these directional couplers 272 and 292 are optional. The IF waveforms for each pair of reflected MP and LP are then amplified by the amplifiers 274 and 294, and sent to the bandpass filters 276 and 296 to reject mixer products. The frequencies are selected so that the mixer products avoid unwanted mixer product interference. The separation between the LPs and the MPs enable band pass filtering separation of each pulse. The components 268-276 and 288-296 can be considered to be mixing stages, respectively.

The power divider 278 splits the waveform energy to provide inputs to the MP bandpass filter 280 and the LP bandpass filter 282. The power divider 298 splits the waveform energy to provide inputs to the MP bandpass filter 300 and the LP bandpass filter 302. The filters 280, 282, 300, 302 are tunable and produce filtered waveforms 310-316 respectively. These waveforms can then be digitized and further processed by downstream radar processing modules. This further processing can include pulse compression, range merging for the reflected LPs and MPs, signal detection, which can include MTD processing and video processing, as well as other processing known to those skilled in the art. The components 278-282 and 298-302 can be considered to be second filtering stages, respectively.

Referring now to FIGS. 9A, 9B and 9C, shown therein are frequency plots showing how the concatenated pulse waveforms generated by the radar system 10 can be varied to satisfy an exemplary blocking profile 350. The blocking profile 350 shows areas of the frequency spectrum which are reserved for other uses at a given radar site and are therefore blocked from being used in the concatenated pulse waveform. In this example, the radar blocking profile 350 indicates that frequency regions 352-358 are blocked from usage and that frequency regions 360-364 are free for usage. The concatenated pulse waveform that is used by the radar system 10 is flexible in that different amounts of frequency separation can be selected for the carrier frequencies Fc1 and Fc2 so that the spectral components of each pair of pulses does not occupy a portion of the blocked frequency regions 352-358. The frequency bandwidth ($\Delta f1$ and $\Delta f2$) of each pair of pulses can also be selected so that a given pair of pulses can fit within a free frequency region as shown in FIG. 9A. This frequency bandwidth ($\Delta f1$ and $\Delta f2$) is related to the IF frequency spread of the different length pulses. FIG. 9B and FIG. 9C show other examples of how the carrier frequencies can be selected so that the concatenated pulse waveform fits within the free frequency regions.

The concatenated waveforms described herein can provide coverage for both short and long range targets as well as use frequency diversity in one PRI. The use of RF and IF frequency separation for the pulses in the concatenated pulse waveform allow different parameters to be selected independently of one another for a given type of pulse in the concatenated waveform. Also, in each PRI, both short and long range radar return data can be processed and RF and IF discrimination is possible. Furthermore, there can be various combinations of pulses that are generated to form the concatenated pulse waveform. For instance, there can be a concatenated pulse waveform with two LPs, which are followed by two MPs, which are in turn followed by two SPs with frequency diversity occurring for each pulse type. There can also be a concatenated pulse waveform with two LPs, followed by one MP, which is in turn followed by one SP and so frequency diversity can be used on the LPs only in this example.

The relationship between the IF, RF and LO frequencies for various concatenated pulse waveforms will now be discussed. As is commonly known, an RF signal that is generated from a mixer that is provided with an IF and an LO signal is given by RF=LO+/−IF. Assuming that the difference product is taken, the RF signal is given by RF=LO−IF. Table 1 provides the frequency parameters for an exemplary concatenated pulse that has one long pulse (P1) occurring before a shorter pulse (P2) (i.e. one set of two pulses).

TABLE 1

Exemplary Concatenated Pulse Waveform 1

| Pulses | Pulse Type 1<br>P1 | Pulse Type 2<br>P2 |
|---|---|---|
| IF | I | I + $\Delta$I |
| LO | $F_c$ + I | $F_c$ + I |
| RF | $F_c$ | $F_c$ − $\Delta$I |

Table 2 provides frequency parameters for an exemplary concatenated pulse that has two sets of two pulses. The first set includes pulses P1 and P2, and the second set includes pulses P1' and P2'. Table 3 provides the frequency parameters for an exemplary concatenated pulse that has three sets of two pulses. The first set includes pulses P1 and P2, the second set includes pulses P1' and P2', and the third set includes pulses P1" and P2".

TABLE 2

Exemplary Concatenated Pulse Waveform 2

|  | Pulse Type 1 | | Pulse Type 2 | |
| --- | --- | --- | --- | --- |
| Pulses | P1 | P1' | P2 | P2' |
| IF | I | I | $I + \Delta I$ | $I + \Delta I$ |
| LO | $F_1 + I$ | $F_2 + I$ | $F_1 + I$ | $F_2 + I$ |
| RF | $F_1$ | $F_2$ | $F_1 - \Delta I$ | $F_2 - \Delta I$ |

TABLE 3

Exemplary Concatenated Pulse Waveform 3

|  | Pulse Type 1 | | | Pulse Type 2 | | |
| --- | --- | --- | --- | --- | --- | --- |
| Pulses | P1 | P1' | P1" | P2' | P2' | P2" |
| IF | I | I | I | $I + \Delta I$ | $I + \Delta I$ | $I + \Delta I$ |
| LO | $F_1 + I$ | $F_2 + I$ | $F_3 + I$ | $F_1 + I$ | $F_2 + I$ | $F_3 + I$ |
| RF | $F_1$ | $F_2$ | $F_3$ | $F_1 - \Delta I$ | $F_2 - \Delta I$ | $F_3 - \Delta I$ |

Table 4 provides the frequency parameters for an exemplary concatenated pulse that has one set of three pulses. The set includes pulses P1, P2, and P3. Table 5 provides the frequency parameters for an exemplary concatenated pulse that has two sets of three pulses. The first set includes pulses P1, P2 and P3, and the second set includes pulses P1', P2' and P3'.

TABLE 4

Exemplary Concatenated Pulse Waveform 4

|  | Pulse Type 1 | Pulse Type 2 | Pulse Type 3 |
| --- | --- | --- | --- |
| Pulses | P1 | P2 | P3 |
| IF | I | $I + \Delta I_1$ | $I + \Delta I_2$ |
| LO | $F_c + I$ | $F_c + I$ | $F_c + I$ |
| RF | $F_c$ | $F_c - \Delta I_1$ | $F_c - \Delta I_2$ |

TABLE 5

Exemplary Concatenated Pulse Waveform 5

|  | Pulse Type 1 | | Pulse Type 2 | | Pulse Type 3 | |
| --- | --- | --- | --- | --- | --- | --- |
| Pulses | P1 | P1' | P2 | P2' | P3 | P3' |
| IF | I | I | $I + \Delta I_1$ | $I + \Delta I_1$ | $I + \Delta I_2$ | $I + \Delta I_2$ |
| LO | $F_1 + I$ | $F_2 + I$ | $F_1 + I$ | $F_2 + I$ | $F_1 + I$ | $F_2 + I$ |
| RF | $F_1$ | $F_2$ | $F_1 - \Delta I_1$ | $F_2 - \Delta I_1$ | $F_1 - \Delta I_2$ | $F_2 - \Delta I_2$ |

Table 6 provides the frequency parameters for the general case of an exemplary concatenated pulse that has N sets of M pulses. The pulse P(N,M) is the $M^{th}$ pulse in the $N^{th}$ set of pulses. It should be noted that in the general case the LO frequencies are switched N×M times when generating pulses P(1,1) to P(1,M), pulses P(2,1) to P(2,M), . . . , and pulses P(N,1) to P(N,M). In order to minimize the number of switching events, the parameters outlined in Table 7 can be used in which the LO frequency used for the first pulse in a subsequent set of pulses is set to be the same as the LO frequency used for the last pulse in the previous set of pulses. The "or" situations for Pulse Type N depends on whether N is odd (the first row applies) or odd (the second row applies).

TABLE 6

Exemplary Concatenated Pulse Waveform For General Case

|  | Pulse Type 1 | Pulse Type 2 | ... | Pulse Type N |
| --- | --- | --- | --- | --- |
| Pulses | P(1, 1) ... P(1, M) | P(2, 1) ... P(2, M) | ... | P(N, 1) ... P(N, M) |
| IF | I ... I | $I + \Delta I_1 ... I + \Delta I_1$ | ... | $I + \Delta I_{N-1} ... I + \Delta I_{N-1}$ |
| LO | $F_1 + I ... F_M + I$ | $F_1 + I ... F_M + I$ | ... | $F_1 + I ... F_M + I$ |
| RF | $F_1 ... F_M$ | $F_1 - \Delta I_1 ... F_M - \Delta I_1$ | ... | $F_1 - \Delta I_{N-1} ... F_M - \Delta I_{N-1}$ |

TABLE 7

Parameters To Reduce LO Switching For Exemplary Concatenated Pulse Waveform For General Case

|  | Pulse Type 1 | Pulse Type 2 | ... | Pulse Type N |
| --- | --- | --- | --- | --- |
| Pulses | P(1, 1) ... P(1, M) | P(2, 1) ... P(2, M) | ... | P(N, 1) ... P(N, M) |
| IF | I ... I | $I + \Delta I_1 ... I + \Delta I_1$ | ... | $I + \Delta I_{N-1} ... I + \Delta I_{N-1}$ |
| LO | $F_1 + I ... F_M + I$ | $F_M + I ... F_1 + I$ | ... | $F_1 + I ... F_M + I$ <br> or or <br> $F_M + I ... F_1 + I$ |
| RF | $F_1 ... F_M$ | $F_M - \Delta I_1 ... F_1 - \Delta I_1$ | ... | $F_1 - \Delta I_{N-1} ... F_M - \Delta I_{N-1}$ <br> or or <br> $F_M - \Delta I_{N-1} ... F_1 - \Delta I_{N-1}$ |

Using the LO switching technique outlined in Table 7, the generation of the pulses for the exemplary concatenated waveform corresponding to Table 2 can be changed to reduce LO switching as shown in Table 8. The LO frequency will now be switched 2 times instead of 3 times. This can also be applied to the exemplary concatenated waveform corresponding to Table 3 to reduce LO switching as shown in Table 9. The LO frequency will now be switched 3 times instead of 5 times. Accordingly, the up-conversion module 34 can be configured to switch between local oscillator frequencies during up-conversion by applying the same local oscillator frequency to a last pulse when generating pulses of a first pulse type and a first pulse when generating pulses of another pulse type to reduce the number of local oscillator frequency switching events.

TABLE 8

Exemplary Concatenated Pulse Waveform of Table 2 With Reduced LO Switching

|  | Pulse Type 1 | | Pulse Type 2 | |
| --- | --- | --- | --- | --- |
| Pulses | P1 | P1' | P2 | P2' |
| IF | I | I | I + ΔI | I + ΔI |
| LO | $F_1 + I$ | $F_2 + I$ | $F_2 + I$ | $F_1 + I$ |
| RF | $F_1$ | $F_2$ | $F_2 - ΔI$ | $F_1 - ΔI$ |

TABLE 9

Exemplary Concatenated Pulse Waveform of Table 3 With Reduced LO Switching

|  | Pulse Type 1 | | Pulse Type 2 | | Pulse Type 3 | |
| --- | --- | --- | --- | --- | --- | --- |
| Pulses | P1 | P1' | P2 | P2' | P3 | P3' |
| IF | I | I | $I + ΔI_1$ | $I + ΔI_1$ | $I + ΔI_2$ | $I + ΔI_2$ |
| LO | $F_1 + I$ | $F_2 + I$ | $F_2 + I$ | $F_1 + I$ | $F_1 + I$ | $F_2 + I$ |
| RF | $F_1$ | $F_2$ | $F_2 - ΔI_1$ | $F_1 - ΔI_1$ | $F_1 - ΔI_2$ | $F_2 - ΔI_2$ |

It should be noted that the concatenated waveforms described herein can be used in a wide range of radar systems. Examples of some of these radar systems include, but are not limited to, long range radar, aircraft navigation radar, airborne radar, ship-based radar, fire control radar, surface wave radar and the like. The concatenated waveforms may also be used with sonar systems.

The elements of the radar system 10 described herein may be implemented through any suitable means known in the art such as discrete components, dedicated hardware, FPGAs and a digital signal processor that executes computer instructions such as DSP-based firmware. If computer instructions are used, they may also be written in Matlab, C, C++, Labview™ or any suitable programming language embodied in a computer readable medium on a computing platform having an operating system and the associated hardware and software that is necessary to implement the functionality of at least a portion of the radar system 10. The computer instructions can be organized into modules or classes, as is known to those skilled in the art, that are implemented and structured according to the structure of the radar system 10. In this case, if a DSP or other processor carries out the computer instructions, it can be considered to be circuitry operatively configured for carrying out at least some of the functionality of the radar system 10. Alternatively, a different structure may be used that can provide the same functionality.

In one aspect, at least one embodiment described herein provides a transceiver for a radar system. The transceiver comprises waveform generation circuitry configured to generate concatenated pulse waveforms, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second sets of pulses having pulses of different lengths and frequencies; transmission circuitry coupled to the waveform generation circuitry and being configured to generate transmission waveforms based on the concatenated pulse waveforms; coupling circuitry coupled to the transmission circuitry and being connectable to an antenna and being configured to send the transmission waveforms to the antenna, receive reflections of the transmission waveforms sensed by the antenna and produce return signals based on the received reflections; and receiving circuitry coupled to the waveform generation circuitry and the coupling circuitry, the receiving circuitry being configured to process the return signals to separate the reflections for each type of pulse in the concatenated pulse waveforms.

The waveform generation circuitry may include a single waveform generator configured to generate the concatenated pulse waveforms at an IF band and an up-conversion module configured to up-convert the concatenated pulse waveforms to an RF band for transmission.

A blocking profile specifying blocked and free frequency regions may be associated with an installation site of the radar system, and the waveform generator may be configured to generate the concatenated pulse waveforms with an IF bandwidth less than the bandwidth of at least one of the free frequency regions, and the up-conversion module may be configured to up-convert the concatenated pulse waveforms to the RF band to be located in at least one of the free frequency regions.

The waveform generator may be configured to generate pulses of a first length at a first IF frequency and pulses of a second length at a second IF frequency, and the waveform generation circuitry can be configured to apply different local oscillator frequencies to pulses of the first length and corresponding local oscillator frequencies to pulses of the second length to form different sets of pulses of two lengths with different local oscillator frequencies.

The waveform generation circuitry may be configured to generate the pulses in the concatenated pulse waveform with longer pulses occurring before shorter pulses in the given PRI.

The waveform generation circuitry may be configured to generate the concatenated pulse waveform with two pulses having a first length followed by two pulses having a second length in the given PRI, the first length being longer than the second length.

The waveform generator may comprise a selection input enabling at least one of the following to be selected: i) the number of the sets of pulses, ii) the number of the pulses in each of the sets of pulses, iii) the length of the pulses in each of the sets of pulses, iv) the carrier frequency associated with each of the sets of pulses, v) the frequency of the pulses in each of the sets of pulses, vi) a modulation function to modulate the pulses in each of the sets of pulses, vii) a shaping function to shape the pulses in each of the sets of pulses, viii) gap lengths between the pulses in each of the sets of pulses, and ix) a frequency diversity factor to specify which of the sets of pulses have pulses for frequency diversity.

The waveform generation circuitry may be configured to generate three or more sets of pulses associated with different carrier frequencies in the given PRI.

The waveform generation circuitry may be configured to generate each set of pulses to have two or more pulses of different lengths in the given PRI.

The lengths of the pulses may be selected to detect at least two of: targets at short range, targets at medium range and targets at long range with respect to an installation site of the radar system.

The up-conversion module may comprise a first filter stage configured to filter the concatenated waveform provided by the waveform generator; a mixing stage configured to up-convert and amplify the filtered concatenated waveform; a second filter stage configured to filter the output of the mixing stage to remove spurious signals; and an output stage configured to amplify the output of the second filter stage and protect against reflections at the output of the up-conversion module.

The receiving circuitry may comprise an RF front end configured to receive the return signals from the coupling circuitry and pre-process the return signals; a first down-converter coupled to the RF front end and configured to process the pre-processed return signals to provide first filtered waveforms corresponding to reflections of pulses associated with the first set of pulses; and a second down-converter coupled to the RF front end and configured to process the pre-processed return signals to provide second filtered waveforms corresponding to reflections of pulses associated with the second set of pulses.

The RF front end may comprise a gain control stage including a sensitivity time control attenuator and a low noise amplifier, the gain control stage being configured to adjust the level of the return signals; and a power divider being configured to divide the output of the gain control stage to produce the pre-processed return signals.

The first down-converter may comprise a first filter stage configured to bandpass filter the pre-processed return signals in a first frequency region associated with the first carrier frequency; a mixing stage configured to down-convert the output of the first filter stage to an IF band used during the generation of the pulses in the first set of pulses; and a second filter stage configured to bandpass filter the output of the mixing stage in multiple frequency regions, each of the multiple frequency regions being associated with IF frequencies of the pulses used during the generation of the pulses for the first set of pulses.

The second down-converter may comprise a third filter stage configured to bandpass filter the pre-processed return signals in a second frequency region associated with the second carrier frequency; a second mixing stage configured to down-convert the output of the third filter stage to an IF band used during the generation of the pulses in the second set of pulses; and a fourth filter stage configured to bandpass filter the output of the second mixing stage in multiple frequency regions, each of the multiple frequency regions being associated with IF frequencies of the pulses used during the generation of the pulses for the second set of pulses.

The waveform generation circuitry may be configured to switch between local oscillator frequencies during up-conversion by applying the same local oscillator frequency to a last pulse when generating pulses of a first pulse type and a first pulse when generating pulses of another pulse type to reduce the number of local oscillator frequency switching events.

In another aspect, at least one embodiment described herein provides waveform generation circuitry configured to generate waveforms for use in radar. The waveform generation circuitry comprises a waveform generator configured to generate concatenated pulse waveforms at an IF band, wherein, in a given pulse repetition interval (PRI), the concatenated pulse waveforms comprise a first type of pulse associated with a first IF frequency and a second type of pulse associated with a second IF frequency; and an up-conversion module configured to up-convert the concatenated pulse waveforms to an RF band to form first and second set of pulses, wherein, in the given PRI, each pulse is up-converted to a different RF frequency, pulses of different lengths are associated with a similar carrier frequency, and at least one pulse from each of the sets of pulses implements frequency diversity.

In another aspect, at least one embodiment described herein provides a radar system comprising a control unit configured to control the operation of the radar system; a transceiver coupled to the control unit and connectable to an antenna, the transceiver being configured to generate and send concatenated pulse waveforms to the antenna and process reflections of the concatenated pulse waveforms sensed by the antenna to generate return signals, the transceiver comprising waveform generation circuitry configured to generate the concatenated pulse waveforms, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second set of pulses having pulses of different lengths and frequencies; and a radar processing unit coupled to the transceiver and the control unit, the radar processing unit being configured to process the return signals and provide information on possible detected targets.

In another aspect, at least one embodiment described herein provides a method for generating and receiving waveforms for use in radar applications. The method comprises:

generating concatenated pulse waveforms, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second set of pulses having pulses of different lengths and frequencies;

generating transmission waveforms based on the concatenated pulse waveforms;

sending the transmission waveforms to an antenna;

receiving reflections of the transmission waveforms sensed by the antenna;

producing return signals based on the received reflections; and processing the return signals to separate the reflections for each type of pulse in the concatenated pulse waveforms.

The method may comprise first generating the concatenated pulse waveforms at an IF band and then up-converting the concatenated pulse waveforms to an RF band for transmission.

In accordance with a blocking profile specifying blocked and free frequency regions, the method may comprise generating the concatenated pulse waveforms at the IF band with an IF bandwidth less than the bandwidth of at least one the free frequency regions, and up-converting the concatenated pulse waveforms to the RF band to be located in at least one of the free frequency regions.

The method may comprise generating pulses of a first length at a first IF frequency and pulses of a second length at a second IF frequency, and applying different local oscillator frequencies to pulses of the first length and corresponding local oscillator frequencies to pulses of the second length to form different sets of pulses of two lengths with different local oscillator frequencies.

The method may comprise generating the pulses in the concatenated pulse waveform with longer pulses occurring before shorter pulses in the given PRI.

The method may comprise generating the concatenated pulse waveform with two pulses having a first length followed by two pulses having a second length in the given PRI, the first length being longer than the second length.

The method may comprise at least one of: i) selecting the number of the sets of pulses, ii) selecting the number of the pulses in each of the sets of pulses, iii) selecting the length of the pulses in each of the sets of pulses, iv) selecting the carrier frequency associated with each of the sets of pulses, v) selecting the frequency of the pulses in each of the sets of pulses, vi) selecting a modulation function to modulate the pulses in each of the sets of pulses, vii) selecting a shaping function to shape the pulses in each of the sets of pulses, and viii) selecting gap lengths between the pulses in each of the sets of pulses, and ix) a frequency diversity factor to specify which of the sets of pulses have pulses for frequency diversity.

The method may comprise generating three or more sets of pulses associated with different carrier frequencies in the given PRI.

The method may comprise generating each set of pulses to have two or more pulses of different lengths in the given PRI.

The method may comprise selecting lengths for the pulses to detect at least two of: targets at short range, targets at medium range and targets at long range with respect to an installation site of the radar system.

When generating the concatenated pulse waveforms, the method may comprise:
 generating the concatenated waveform at an IF band;
 filtering the concatenated waveform in the IF band;
 up-converting the filtered concatenated waveform to an RF band;
 amplifying the up-converted concatenated waveform;
 filtering the amplified concatenated waveform to remove spurious signals; and
 amplifying the filtered amplified concatenated waveform while protecting against reflections.

When processing the return signals, the method may comprise:
 pre-processing the return signals;
 processing the pre-processed return signals to provide first filtered waveforms corresponding to reflections of pulses associated with the first set of pulses; and
 processing the pre-processed return signals to provide second filtered waveforms corresponding to reflections of pulses associated with the second set of pulses.

When pre-processing the return signals, the method may comprise:
 adjusting the level of the return signals; and
 dividing the power of the adjusted return signals to produce the pre-processed return signals.

When processing the pre-processed return signals to provide the first filtered waveforms, the method may comprise:
 applying a first stage of bandpass filtering to the pre-processed return signals in a first frequency region associated with the first carrier frequency;
 down-converting the bandpass filtered signals to an IF band used during the generation of the pulses for the first set of pulses; and applying a second stage of bandpass filtering to the down-converted signals in multiple frequency regions, each of the multiple frequency regions being associated with IF frequencies used during the generation of the pulses for the first set of pulses.

When processing the pre-processed return signals to provide the second filtered waveforms, the method may comprise:
 applying a second stage of bandpass filtering to the pre-processed return signals in a second frequency region associated with the second carrier frequency;
 down-converting these bandpass filtered signals to an IF band used during the generation of the pulses for the second set of pulses; and
 applying a fourth stage of bandpass filtering to these down-converted signals in multiple frequency regions, each of the multiple frequency regions being associated with IF frequencies used during the generation of the pulses for the second set of pulses.

While generating concatenated pulse waveforms, the method may comprise switching between local oscillator frequencies during up-conversion by applying the same local oscillator frequency to a last pulse when generating pulses of a first pulse type and a first pulse when generating pulses of another pulse type to reduce the number of local oscillator frequency switching events.

In another aspect, at least one embodiment described herein provides a method of generating waveforms for use in radar. The method comprises:
 generating concatenated pulse waveforms at an IF band, wherein, in a given pulse repetition interval, the concatenated pulse waveforms comprise a first group of pulses associated with a first IF frequency and a second group of pulses associated at a second IF frequency; and
 up-converting the concatenated pulse waveforms to an RF band to form first and second set of pulses, wherein, in the given pulse interval, each pulse is up-converted to a different RF frequency, pulses of different lengths are associated with a similar carrier frequency, at least one pulse from each of the sets of pulses implements frequency diversity, and longer pulses are temporally ordered before shorter pulses.

While certain features have been illustrated and described for the various embodiments discussed herein, modifications, substitutions, changes, and equivalents can be made, without departing from the scope of these embodiments as defined in the appended claims.

What is claimed is:
1. A transceiver for a radar system, the transceiver comprising:
 waveform generation circuitry configured to generate concatenated pulse waveforms at an IF band, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second sets of pulses having pulses of different lengths and frequencies;
 transmission circuitry coupled to the waveform generation circuitry and being configured to generate transmission waveforms based on the concatenated pulse waveforms;
 coupling circuitry coupled to the transmission circuitry and being connectable to an antenna and being configured to send the transmission waveforms to the antenna, receive reflections of the transmission waveforms sensed by the antenna and produce return signals based on the received reflections; and
 receiving circuitry coupled to the waveform generation circuitry and the coupling circuitry, the receiving circuitry being configured to process the return signals to separate the reflections for each type of pulse in the concatenated pulse waveforms.

2. The transceiver of claim 1, wherein the waveform generation circuitry comprises a single waveform generator configured to generate the concatenated pulse waveforms at an IF band and an up-conversion module configured to up-convert the concatenated pulse waveforms to an RF band for transmission.

3. The transceiver of claim 2, wherein a blocking profile specifying blocked and free frequency regions is associated with an installation site of the radar system, and the waveform generator is configured to generate the concatenated pulse waveforms with an IF bandwidth less than the bandwidth of at least one of the free frequency regions, and the up-conversion module is configured to up-convert the concatenated pulse waveforms to the RF band to be located in at least one of the free frequency regions.

4. The transceiver of claim 2, wherein the waveform generator is configured to generate pulses of a first length at a first IF frequency and pulses of a second length at a second IF frequency, and the waveform generation circuitry is configured to apply different local oscillator frequencies to pulses of the first length and corresponding local oscillator frequencies to pulses of the second length to form different sets of pulses of two lengths with different local oscillator frequencies.

5. The transceiver of claim 2, wherein the up-conversion module comprises:
a first filter stage configured to filter the concatenated waveform provided by the waveform generator;
a mixing stage configured to up-convert and amplify the filtered concatenated waveform;
a second filter stage configured to filter the output of the mixing stage to remove spurious signals; and
an output stage configured to amplify the output of the second filter stage and protect against reflections at the output of the up-conversion module.

6. The transceiver of claim 1, wherein the waveform generation circuitry is configured to generate the pulses in the concatenated pulse waveform with longer pulses occurring before shorter pulses in the given PRI.

7. The transceiver of claim 1, wherein the waveform generation circuitry is configured to generate the concatenated pulse waveform with two pulses having a first length followed by two pulses having a second length in the given PRI, the first length being longer than the second length.

8. The transceiver of claim 1, wherein the waveform generator comprises a selection input enabling at least one of the following to be selected: i) the number of the sets of pulses, ii) the number of the pulses in each of the sets of pulses, iii) the length of the pulses in each of the sets of pulses, iv) the carrier frequency associated with each of the sets of pulses, v) the frequency of the pulses in each of the sets of pulses, vi) a modulation function to modulate the pulses in each of the sets of pulses, vii) a shaping function to shape the pulses in each of the sets of pulses, viii) gap lengths between the pulses in each of the sets of pulses, and ix) a frequency diversity factor to specify which of the sets of pulses have pulses for frequency diversity.

9. The transceiver of claim 1, wherein the waveform generation circuitry is configured to generate three or more sets of pulses associated with different carrier frequencies in the given PRI.

10. The transceiver of claim 1, wherein the waveform generation circuitry is configured to generate each set of pulses to have two or more pulses of different lengths in the given PRI.

11. The transceiver of claim 1, wherein the lengths are selected to detect at least two of: targets at short range, targets at medium range and targets at long range with respect to an installation site of the radar system.

12. The transceiver of claim 1, wherein the receiving circuitry comprises:
an RF front end configured to receive the return signals from the coupling circuitry and pre-process the return signals;
a first down-converter coupled to the RF front end and configured to process the pre-processed return signals to provide first filtered waveforms corresponding to reflections of pulses associated with the first set of pulses; and
a second down-converter coupled to the RF front end and configured to process the pre-processed return signals to provide second filtered waveforms corresponding to reflections of pulses associated with the second set of pulses.

13. The transceiver of claim 12, wherein the RF front end comprises:
a gain control stage including a sensitivity time control attenuator and a low noise amplifier, the gain control stage being configured to adjust the level of the return signals; and
a power divider being configured to divide the output of the gain control stage to produce the pre-processed return signals.

14. The transceiver of claim 12, wherein the first down-converter comprises:
a first filter stage configured to bandpass filter the pre-processed return signals in a first frequency region associated with the first carrier frequency;
a mixing stage configured to down-convert the output of the first filter stage to an IF band used during the generation of the pulses in the first set of pulses; and
a second filter stage configured to bandpass filter the output of the mixing stage in multiple frequency regions, each of the multiple frequency regions being associated with IF frequencies of the pulses used during the generation of the pulses for the first set of pulses.

15. The transceiver of claim 14, wherein the second down-converter comprises:
a third filter stage configured to bandpass filter the pre-processed return signals in a second frequency region associated with the second carrier frequency;
a second mixing stage configured to down-convert the output of the third filter stage to an IF band used during the generation of the pulses in the second set of pulses; and
a fourth filter stage configured to bandpass filter the output of the second mixing stage in multiple frequency regions, each of the multiple frequency regions being associated with IF frequencies of the pulses used during the generation of the pulses for the second set of pulses.

16. The transceiver of claim 1, wherein the waveform generation circuitry is configured to switch between local oscillator frequencies during up-conversion by applying the same local oscillator frequency to a last pulse when generating pulses of a first pulse type and a first pulse when generating pulses of another pulse type to reduce the number of local oscillator frequency switching events.

17. Waveform generation circuitry configured to generate waveforms for use in radar, the waveform generation circuitry comprising:
a waveform generator configured to generate concatenated pulse waveforms at an IF band, wherein, in a given pulse repetition interval (PRI), the concatenated pulse waveforms comprise a first type of pulse associated with a first IF frequency and a second type of pulse associated with a second IF frequency; and an up-conversion module configured to up-convert the concatenated pulse waveforms to an RF band to form first and second set of pulses, wherein, in the given PRI, each pulse is up-converted to a different RF frequency, pulses of different lengths are associated with a similar carrier frequency, and at least one pulse from each of the sets of pulses implements frequency diversity.

18. The waveform generation circuitry of claim 17, wherein in accordance with a blocking profile specifying blocked and free frequency regions, the waveform generator is configured to generate the concatenated pulse waveforms with an IF bandwidth less than the bandwidth of at least one the free frequency regions, and the up-conversion module is configured to up-convert the concatenated pulse waveforms to be located in at least one of the free frequency regions.

19. The waveform generation circuitry of claim 17, wherein the waveform generation circuitry is configured to generate the pulses in the concatenated pulse waveform with longer pulses occurring before shorter pulses in the given PRI.

20. The waveform generation circuitry of claim 17, wherein the waveform generator comprises a selection input enabling at least one of the following to be selected: i) the number of the sets of pulses, ii) the number of the pulses in each of the sets of pulses, iii) the length of the pulses in each of the sets of pulses, iv) the carrier frequency associated with each of the sets of pulses, v) the frequency of the pulses in each of the sets of pulses, vi) a modulation function to modulate the pulses in each of the sets of pulses, vii) a shaping function to shape the pulses in each of the sets of pulses, and viii) gap lengths between the pulses in each of the sets of pulses, and ix) a frequency diversity factor to specify which of the sets of pulses have pulses for frequency diversity.

21. The waveform generation circuitry of claim 17, wherein the waveform generation circuitry is configured to generate three or more sets of pulses associated with different carrier frequencies in the given PRI.

22. The waveform generation circuitry of claim 17, wherein the waveform generation circuitry is configured to generate each set of pulses to have two or more pulses of different lengths in the given PRI.

23. The waveform generation circuitry of claim 17, wherein the lengths are selected to detect at least two of: targets at short range, targets at medium range and targets at long range with respect to an installation site of the radar system.

24. A radar system comprising:
a control unit configured to control the operation of the radar system;
a transceiver coupled to the control unit and connectable to an antenna, the transceiver being configured to generate and send concatenated pulse waveforms to the antenna and process reflections of the concatenated pulse waveforms sensed by the antenna to generate return signals, the transceiver comprising waveform generation circuitry configured to generate the concatenated pulse waveforms at an IF band, wherein, in a given pulse repetition interval (PRI), the concatenated pulse waveforms comprise a first set of pulses associated with a first carrier frequency and a second set of pulses associated with a second carrier frequency for frequency diversity in one PRI, the first and second set of pulses having pulses of different lengths and frequencies; and a radar processing unit coupled to the transceiver and the control unit, the radar processing unit being configured to process the return signals and provide information on possible detected targets.

25. The radar system of claim 24, wherein the waveform generation circuitry comprises a single waveform generator configured to generate the concatenated pulse waveforms at an IF band and an up-conversion module configured to up-convert the concatenated pulse waveforms to an RF band for transmission.

26. The radar system of claim 25, wherein a blocking profile specifying blocked and free frequency regions is associated with an installation site of the radar system, and the waveform generator is configured to generate the concatenated pulse waveforms with an IF bandwidth less than the bandwidth of at least one the free frequency regions, and the up-conversion module is configured to up-convert the concatenated pulse waveforms to be located in at least one of the free frequency regions.

27. The radar system of claim 24, wherein the waveform generation circuitry is configured to generate the pulses in the concatenated pulse waveform with longer pulses occurring before shorter pulses in the given PRI.

28. The radar system of claim 24, wherein the waveform generation circuitry comprises a selection input enabling at least one of the following to be selected: i) the number of the sets of pulses, ii) the number of the pulses in each of the sets of pulses, iii) the length of the pulses in each of the sets of pulses, iv) the carrier frequency associated with each of the sets of pulses, v) the frequency of the pulses in each of the sets of pulses, vi) a modulation function to modulate the pulses in each of the sets of pulses, vii) a shaping function to shape the pulses in each of the sets of pulses, and viii) gap lengths between the pulses in each of the sets of pulses, and ix) a frequency diversity factor to specify which of the sets of pulses have pulses for frequency diversity.

29. The radar system of claim 24, wherein the waveform generation circuitry is configured to generate three or more sets of pulses associated with different carrier frequencies in the given PRI.

30. The radar system of claim 24, wherein the waveform generation circuitry is configured to generate each set of pulses to have two or more pulses of different lengths in the given PRI.

31. The radar system of claim 24, wherein the lengths are selected to detect at least two of: targets at short range, targets at medium range and targets at long range with respect to an installation site of the radar system.

* * * * *

UNITED STATES PATENT AND TRADEMARK OFFICE
CERTIFICATE OF CORRECTION

| | | |
|---|---|---|
| PATENT NO. | : 7,773,028 B2 | Page 1 of 1 |
| APPLICATION NO. | : 11/832973 | |
| DATED | : August 10, 2010 | |
| INVENTOR(S) | : Tony Meng Yuen Chan et al. | |

It is certified that error appears in the above-identified patent and that said Letters Patent is hereby corrected as shown below:

Abstract, line 3, delete "circuitry a" and replace with --circuitry, a--

Col. 6, line 12, delete "in"

Col. 29, lines 14-15, delete "one the" and replace with --one of the--

Col. 30, line 24, delete "one the" and replace with --one of the--

Signed and Sealed this
Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,773,028 B2  Page 1 of 1
APPLICATION NO. : 11/832973
DATED : August 10, 2010
INVENTOR(S) : Tony Meng Yuen Chan et al.

It is certified that error appears in the above-identified patent and that said Letters Patent is hereby corrected as shown below:

On the Title Page item (73), delete "Assignee: Raytheon Company, Waltham, MA (US)" and replace with --Assignee: Raytheon Canada Limited, Ontario (CA)--

Signed and Sealed this
Third Day of May, 2011

David J. Kappos
*Director of the United States Patent and Trademark Office*